US012205598B2

(12) United States Patent
Eksler

(10) Patent No.: US 12,205,598 B2
(45) Date of Patent: Jan. 21, 2025

(54) SWITCHING BETWEEN STEREO CODING MODES IN A MULTICHANNEL SOUND CODEC

(71) Applicant: VOICEAGE CORPORATION, Town of Mount Royal (CA)

(72) Inventor: Vaclav Eksler, Brno (CZ)

(73) Assignee: VOICEAGE CORPORATION, Town of Mount Royal (CA)

( * ) Notice: Subject to any disclaimer, the term of this patent is extended or adjusted under 35 U.S.C. 154(b) by 362 days.

(21) Appl. No.: 17/758,115

(22) PCT Filed: Feb. 1, 2021

(86) PCT No.: PCT/CA2021/050114
§ 371 (c)(1),
(2) Date: Jun. 28, 2022

(87) PCT Pub. No.: WO2021/155460
PCT Pub. Date: Aug. 12, 2021

(65) Prior Publication Data

US 2023/0051420 A1 Feb. 16, 2023

Related U.S. Application Data

(60) Provisional application No. 62/969,203, filed on Feb. 3, 2020.

(51) Int. Cl.
*G10L 19/008* (2013.01)
*G10L 21/04* (2013.01)

(52) U.S. Cl.
CPC ............ *G10L 19/008* (2013.01); *G10L 21/04* (2013.01)

(58) Field of Classification Search
CPC ....... G10L 19/008; G10L 19/24; G10L 19/22; G10L 19/02; G10L 21/04; G10L 19/032;
(Continued)

(56) References Cited

U.S. PATENT DOCUMENTS 10,236,007 B2 3/2019 Disch et al.
2006/0173675 A1* 8/2006 Ojanpera ................ G10L 19/22 704/E19.041
(Continued)

FOREIGN PATENT DOCUMENTS

WO 2017/049397 A1 3/2017
WO 2019/056107 A1 3/2019
WO 2019/105575 A1 6/2019

OTHER PUBLICATIONS

M. Neuendorf et al., "MPEG Unified Speech and Audio Coding—The ISO/MPEG Standard for High-Efficiency Audio Coding of all Content Types", Journal of the Audio Engineering Society, vol. 61, No. 12, Dec. 2013, pp. 956-977.
(Continued)

*Primary Examiner* — Angela A Armstrong
(74) *Attorney, Agent, or Firm* — Fay Kaplun & Marcin, LLP

(57) ABSTRACT

A method and device for encoding a stereo sound signal comprise stereo encoders using stereo modes operating in time domain (TD), in frequency domain (FD) or in modified discrete Fourier transform (MDCT) domain. A controller controls switching between the TD, FD and MDCT stereo modes. Upon switching from one stereo mode to the other, the switching controller may (a) recalculate at least one length of down-processed/mixed signal in a current frame of the stereo sound signal, (b) reconstruct a down-processed/mixed signal and also other signals related to the other stereo mode in the current frame, (c) adapt data structures and/or memories for coding the stereo sound signal in the current frame using the other stereo mode, and/or (d) alter a TD stereo channel down-mixing to maintain a correct phase of
(Continued)

left and right channels of the stereo sound signal. Corresponding stereo sound signal decoding method and device are described.

76 Claims, 16 Drawing Sheets

(58) Field of Classification Search
CPC ....... G10L 19/09; G10L 25/21; G10L 19/002; G10L 19/06; G10L 25/03; G10L 25/51; G10L 25/18; G10L 25/27; G10L 19/12; G10L 19/26; G10L 25/06; G10L 19/00; G10L 19/04; G10L 19/08; G10L 19/13; G10L 19/18; G10L 2019/0011; G10L 21/038; G10L 19/012; G10L 21/0216; G10L 25/84; H04S 2400/03; H04S 1/007; H04S 2400/01; H04S 1/00; H04S 7/30; H04S 1/002
See application file for complete search history.

(56) References Cited

U.S. PATENT DOCUMENTS

| | | | |
|---|---|---|---|
| 2010/0070285 | A1 | 3/2010 | Kim et al. |
| 2017/0365263 | A1 | 12/2017 | Disch et al. |

OTHER PUBLICATIONS

3GPP TS 26.445, v.12.0.0, "Codec for Enhanced Voice Services (EVS); Detailed Algorithmic Description", Sep. 2014, pp. 17-130, 239-254, 262-274, 471-473, 481-482, and 613-616.

Dolby Laboratories Inc., "IVAS design constraints from an end-to-end perspective", 3GPP SA4 Contribution S4-181099, SA4 Meeting #100, Oct. 15, 2018, pp. 1-12.

Dietz et al., "Overview of the EVS Codec Architecture", 2015 IEEE International Conference on Acoustics, Speech and Signal Processing (ICASSP), 2015, pp. 5698-5702.

McGrath et al., "Immersive Audio Coding for Virtual Reality Using a Metadata-assisted Extension of the 3GPP EVS Codec", 2019 IEEE International Conference on Acoustics, Speech and Signal Processing (ICASSP), 2019, pp. 730-734.

Baumgarte et al., "Binaural cue coding—Part I: Psychoacoustic fundamentals and design principles," IEEE Trans. Speech Audio Processing, vol. 11, Nov. 2003, pp. 509-519.

Neuendorf et al., "The ISO/MPEG Unified Speech and Audio Coding Standard—Consistent High Quality for All Content Types and at All Bit Rates", J. Audio Eng. Soc., vol. 61, No. 12, Dec. 2013, pp. 956-977.

Herre et al., "MPEG-H Audio—The New Standard for Universal Spatial / 3D Audio Coding", 137th International AES Convention, Paper 9095, Los Angeles, J. Audio Eng. Soc., vol. 62, No. 12, Oct. 2014, pp. 821-830.

3GPP SA4 Contribution S4-180462, "On spatial metadata for IVAS spatial audio input format", SA4 Meeting #98, Apr. 9-13, 2018, 7 sheets, https://www.3gpp.org/ftp/tsg_sa/WG4_CODEC/TSG4_98/Docs/S4-180462.zip.

Malenovsky et al., "Method and Device for Classification of Uncorrelated Stereo Content, Cross-Talk Detection, and Stereo Mode Selection in a Sound Codec," U.S. Appl. No. 63/075,984, filed Sep. 9, 2020, 146 sheets.

* cited by examiner

Cont. On FIG.7A-2

SWITCHING BETWEEN STEREO CODING MODES IN A MULTICHANNEL SOUND CODEC

TECHNICAL FIELD

The present disclosure relates to stereo sound encoding, in particular but not exclusively switching between "stereo coding modes" (hereinafter also "stereo modes") in a multichannel sound codec capable, in particular but not exclusively, of producing a good stereo quality for example in a complex audio scene at low bit-rate and low delay.

In the present disclosure and the appended claims:

The term "sound" may be related to speech, audio and any other sound;

The term "stereo" is an abbreviation for "stereophonic"; and

The term "mono" is an abbreviation for "monophonic".

BACKGROUND

Historically, conversational telephony has been implemented with handsets having only one transducer to output sound only to one of the user's ears. In the last decade, users have started to use their portable handset in conjunction with a headphone to receive the sound over their two ears mainly to listen to music but also, sometimes, to listen to speech. Nevertheless, when a portable handset is used to transmit and receive conversational speech, the content is still mono but presented to the user's two ears when a headphone is used.

With the newest 3GPP speech coding standard as described in Reference [1], of which the full content is incorporated herein by reference, the quality of the coded sound, for example speech and/or audio that is transmitted and received through a portable handset has been significantly improved. The next natural step is to transmit stereo information such that the receiver gets as close as possible to a real life audio scene that is captured at the other end of the communication link.

In audio codecs, for example as described in Reference [2], of which the full content is incorporated herein by reference, transmission of stereo information is normally used.

For conversational speech codecs, mono signal is the norm. When a stereo signal is transmitted, the bit-rate often needs to be doubled since both the left and right channels of the stereo signal are coded using a mono codec. This works well in most scenarios, but presents the drawbacks of doubling the bit-rate and failing to exploit any potential redundancy between the two channels (left and right channels of the stereo signal). Furthermore, to keep the overall bit-rate at a reasonable level, a very low bit-rate for each channel is used, thus affecting the overall sound quality. To reduce the bit-rate, efficient stereo coding techniques have been developed and used. As non-limitative examples, the use of three stereo coding techniques that can be efficiently used at low bit-rates is discussed in the following paragraphs.

A first stereo coding technique is called parametric stereo. Parametric stereo coding encodes two, left and right channels as a mono signal using a common mono codec plus a certain amount of stereo side information (corresponding to stereo parameters) which represents a stereo image. The two input, left and right channels are down-mixed into a mono signal, and the stereo parameters are then computed usually in transform domain, for example in the Discrete Fourier Transform (DFT) domain, and are related to so-called binaural or inter-channel cues. The binaural cues (Reference [3], of which the full content is incorporated herein by reference) comprise Interaural Level Difference (ILD), Interaural Time Difference (ITD) and Interaural Correlation (IC). Depending on the signal characteristics, stereo scene configuration, etc., some or all binaural cues are coded and transmitted to the decoder. Information about what binaural cues are coded and transmitted is sent as signaling information, which is usually part of the stereo side information. A particular binaural cue can be also quantized using different coding techniques which results in a variable number of bits being used. Then, in addition to the quantized binaural cues, the stereo side information may contain, usually at medium and higher bit-rates, a quantized residual signal that results from the down-mixing. The residual signal can be coded using an entropy coding technique, e.g. an arithmetic coder. Parametric stereo coding with stereo parameters computed in a transform domain will be referred to in the present disclosure as "DFT stereo" coding.

Another stereo coding technique is a technique operating in time-domain (TD). This stereo coding technique mixes the two input, left and right channels into so-called primary channel and secondary channel. For example, following the method as described in Reference [4], of which the full content is incorporated herein by reference, time-domain mixing can be based on a mixing ratio, which determines respective contributions of the two input, left and right channels upon production of the primary channel and the secondary channel. The mixing ratio is derived from several metrics, e.g. normalized correlations of the input left and right channels with respect to a mono signal version or a long-term correlation difference between the two input left and right channels. The primary channel can be coded by a common mono codec while the secondary channel can be coded by a lower bit-rate codec. The secondary channel coding may exploit coherence between the primary and secondary channels and might re-use some parameters from the primary channel. Time-domain stereo coding will be referred to in the present disclosure as "TD stereo" coding. In general, TD stereo coding is most efficient at lower and medium bit-rates for coding speech signals.

A third stereo coding technique is a technique operating in the Modified Discrete Cosine Transform (MDCT) domain. It is based on joint coding of both the left and right channels while computing global ILD and Mid/Side (M/S) processing in whitened spectral domain. This third stereo coding technique uses several tools adapted from TCX (Transform Coded eXcitation) coding in MPEG (Moving Picture Experts Group) codecs as described for example in References [6] and [7] of which the full contents are incorporated herein by reference; these tools may include TCX core coding, TCX LTP (Long-Term Prediction) analysis, TCX noise filling, Frequency-Domain Noise Shaping (FDNS), stereophonic Intelligent Gap Filling (IGF), and/or adaptive bit allocation between channels. In general, this third stereo coding technique is efficient to encode all kinds of audio content at medium and high bit-rates. The MDCT-domain stereo coding technique will be referred to in the present disclosure as "MDCT stereo coding". In general, MDCT stereo coding is most efficient at medium and high bit-rates for coding general audio signals.

In recent years, stereo coding was further extended to multichannel coding. There exist several techniques to provide multichannel coding but the fundamental core of all these techniques is often based on single or multiple instance(s) of mono or stereo coding techniques. Thus, the present disclosure presents switching between stereo coding modes that can be part of multichannel coding techniques such as Metadata-Assisted Spatial Audio (MASA) as described for example in Reference [8] of which the full content is incorporated herein by reference. In the MASA approach, the MASA metadata (e.g. direction, energy ratio, spread coherence, distance, surround coherence, all in several time-frequency slots) are generated in a MASA analyzer, quantized, coded, and passed into the bit-stream while MASA audio channel(s) are treated as (multi-)mono or (multi-)stereo transport signals coded by the core coder(s). At the MASA decoder, MASA metadata then guide the decoding and rendering process to recreate an output spatial sound.

SUMMARY

The present disclosure provides stereo sound signal encoding devices and methods as defined in the appended claims.

The foregoing and other objects, advantages and features of the stereo encoding and decoding devices and methods will become more apparent upon reading of the following non-restrictive description of illustrative embodiments thereof, given by way of example only with reference to the accompanying drawings.

DETAILED DESCRIPTION

As mentioned hereinabove, the present disclosure relates to stereo sound encoding, in particular but not exclusively to switching between stereo coding modes in a sound, including speech and/or audio, codec capable in particular but not exclusively of producing a good stereo quality for example in a complex audio scene at low bit-rate and low delay. In the present disclosure, a complex audio scene includes situations, for example but not exclusively, in which (a) the correlation between the sound signals that are recorded by the microphones is low, (b) there is an important fluctuation of the background noise, and/or (c) an interfering talker is present. Non-limitative examples of complex audio scenes comprise a large anechoic conference room with an A/B microphones configuration, a small echoic room with binaural microphones, and a small echoic room with a mono/side microphones set-up. All these room configurations could include fluctuating background noise and/or interfering talkers.

Figure 1:
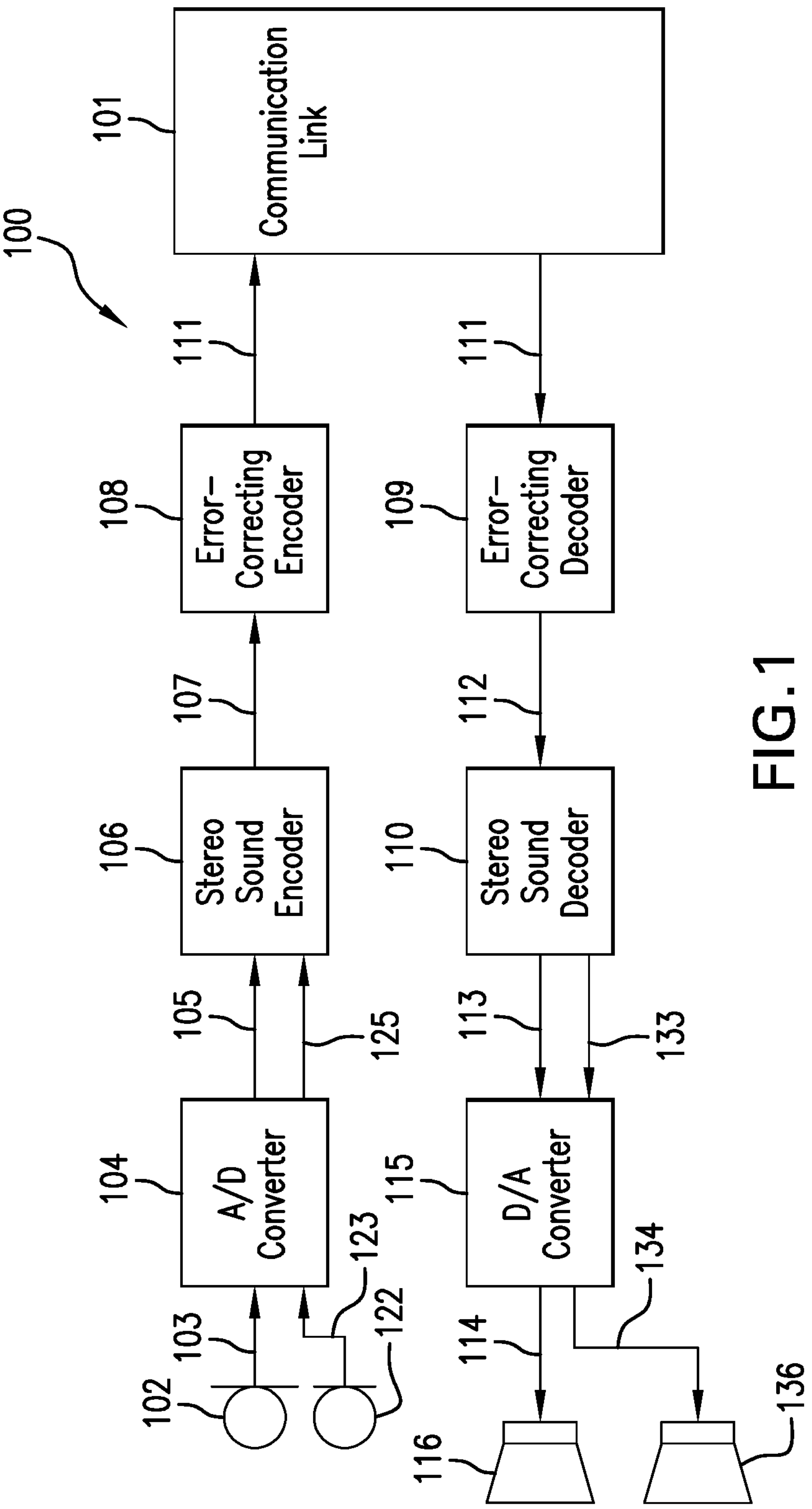
FIG. 1 is a schematic block diagram of a sound processing and communication system depicting a possible context of implementation of the stereo encoding and decoding devices and methods.

FIG. 1 is a schematic block diagram of a stereo sound processing and communication system 100 depicting a possible context of implementation of the IVAS stereo encoding device and method and IVAS stereo decoding device and method.

The stereo sound processing and communication system 100 of FIG. 1 supports transmission of a stereo sound signal across a communication link 101. The communication link 101 may comprise, for example, a wire or an optical fiber link. Alternatively, the communication link 101 may comprise at least in part a radio frequency link. The radio frequency link often supports multiple, simultaneous communications requiring shared bandwidth resources such as may be found with cellular telephony. Although not shown, the communication link 101 may be replaced by a storage device in a single device implementation of the system 100 that records and stores the coded stereo sound signal for later playback.

Still referring to FIG. 1, for example a pair of microphones 102 and 122 produces left 103 and right 123 channels of an original analog stereo sound signal. As indicated in the foregoing description, the sound signal may comprise, in particular but not exclusively, speech and/or audio.

The left 103 and right 123 channels of the original analog sound signal are supplied to an analog-to-digital (A/D) converter 104 for converting them into left 105 and right 125 channels of an original digital stereo sound signal. The left 105 and right 125 channels of the original digital stereo sound signal may also be recorded and supplied from a storage device (not shown).

A stereo sound encoder 106 codes the left 105 and right 125 channels of the original digital stereo sound signal thereby producing a set of coding parameters that are multiplexed under the form of a bit-stream 107 delivered to an optional error-correcting encoder 108. The optional error-correcting encoder 108, when present, adds redundancy to the binary representation of the coding parameters in the bit-stream 107 before transmitting the resulting bit-stream 111 over the communication link 101.

On the receiver side, an optional error-correcting decoder 109 utilizes the above mentioned redundant information in the received digital bit-stream 111 to detect and correct errors that may have occurred during transmission over the communication link 101, producing a bit-stream 112 with received coding parameters. A stereo sound decoder 110 converts the received coding parameters in the bit-stream 112 for creating synthesized left 113 and right 133 channels of the digital stereo sound signal. The left 113 and right 133 channels of the digital stereo sound signal reconstructed in the stereo sound decoder 110 are converted to synthesized left 114 and right 134 channels of the analog stereo sound signal in a digital-to-analog (D/A) converter 115.

The synthesized left 114 and right 134 channels of the analog stereo sound signal are respectively played back in a pair of loudspeaker units, or binaural headphones, 116 and 136. Alternatively, the left 113 and right 133 channels of the digital stereo sound signal from the stereo sound decoder 110 may also be supplied to and recorded in a storage device (not shown).

For example, (a) the left channel of FIG. 1 may be implemented by the left channel of FIGS. 2-13, (b) the right channel of FIG. 1 may be implemented by the right channel of FIGS. 2-13, (c) the stereo sound encoder 106 of FIG. 1 may be implemented by the IVAS stereo encoding device of FIGS. 2-7, and (d) the stereo sound decoder 110 of FIG. 1 may be implemented by the IVAS stereo decoding device of FIGS. 8-13.

1. Switching Between Stereo Modes in the IVAS Stereo Encoding Device 200 and Method 250

Figure 2:
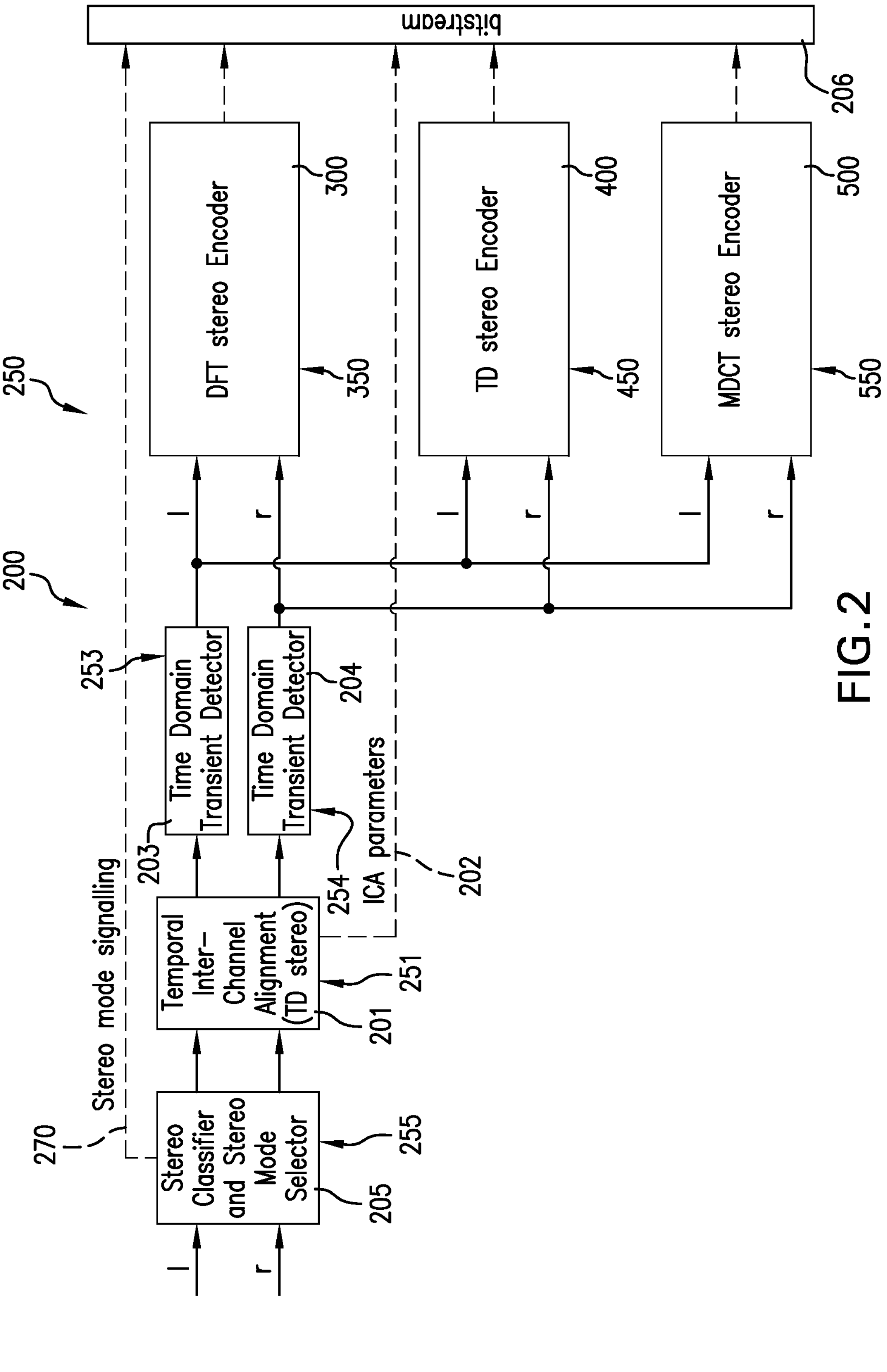
FIG. 2 is a high-level block diagram illustrating concurrently an Immersive Voice and Audio Services (IVAS) stereo encoding device and the corresponding stereo encoding method, wherein the IVAS stereo encoding device comprise a Frequency-Domain (FD) stereo encoder, a Time-Domain (TD) stereo encoder, and a Modified Discrete Cosine Transform (MDCT) stereo encoder, wherein the FD stereo encoder implementation is based on Discrete Fourier Transform (DFT) (hereinafter "DFT stereo encoder") in this illustrative embodiment and accompanying drawings.
Figure 3:
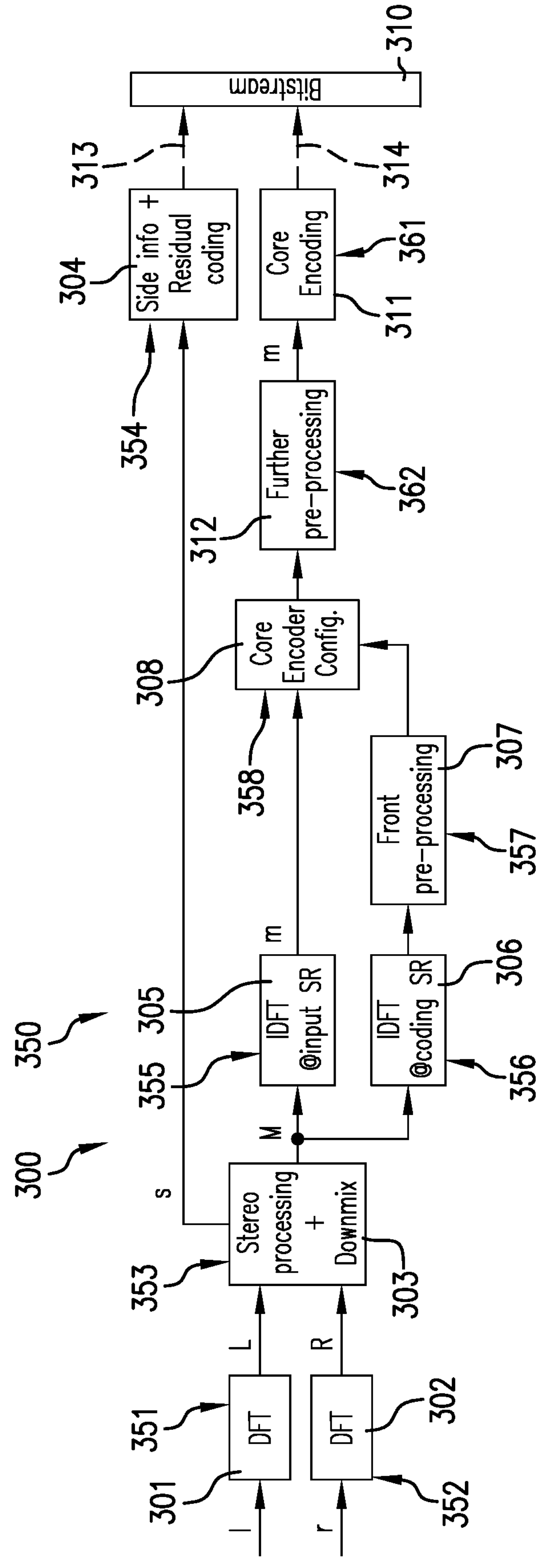
FIG. 3 is a block diagram illustrating concurrently the DFT stereo encoder of FIG. 2 and the corresponding DFT stereo encoding method.
Figure 4:
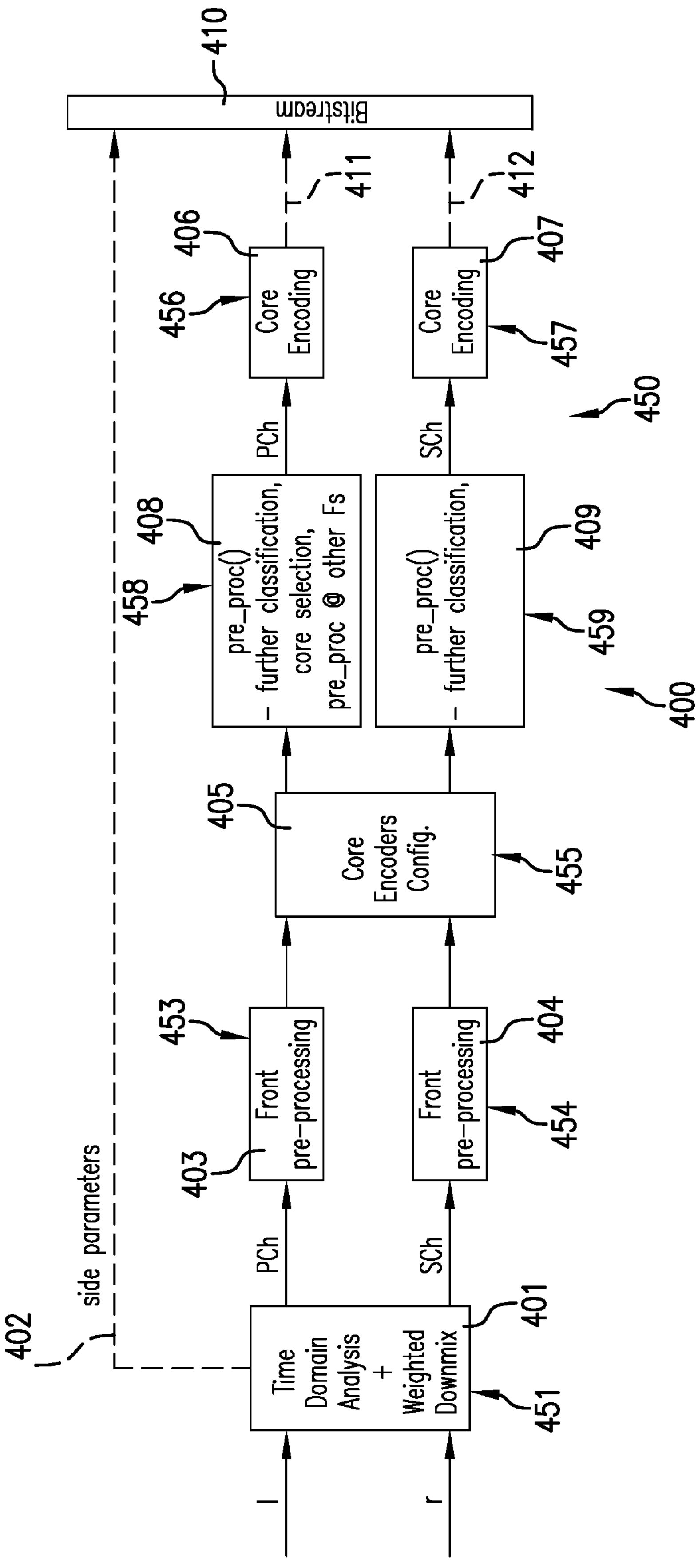
FIG. 4 is a block diagram illustrating concurrently the TD stereo encoder of FIG. 2 and the corresponding TD stereo encoding method.
Figure 5:
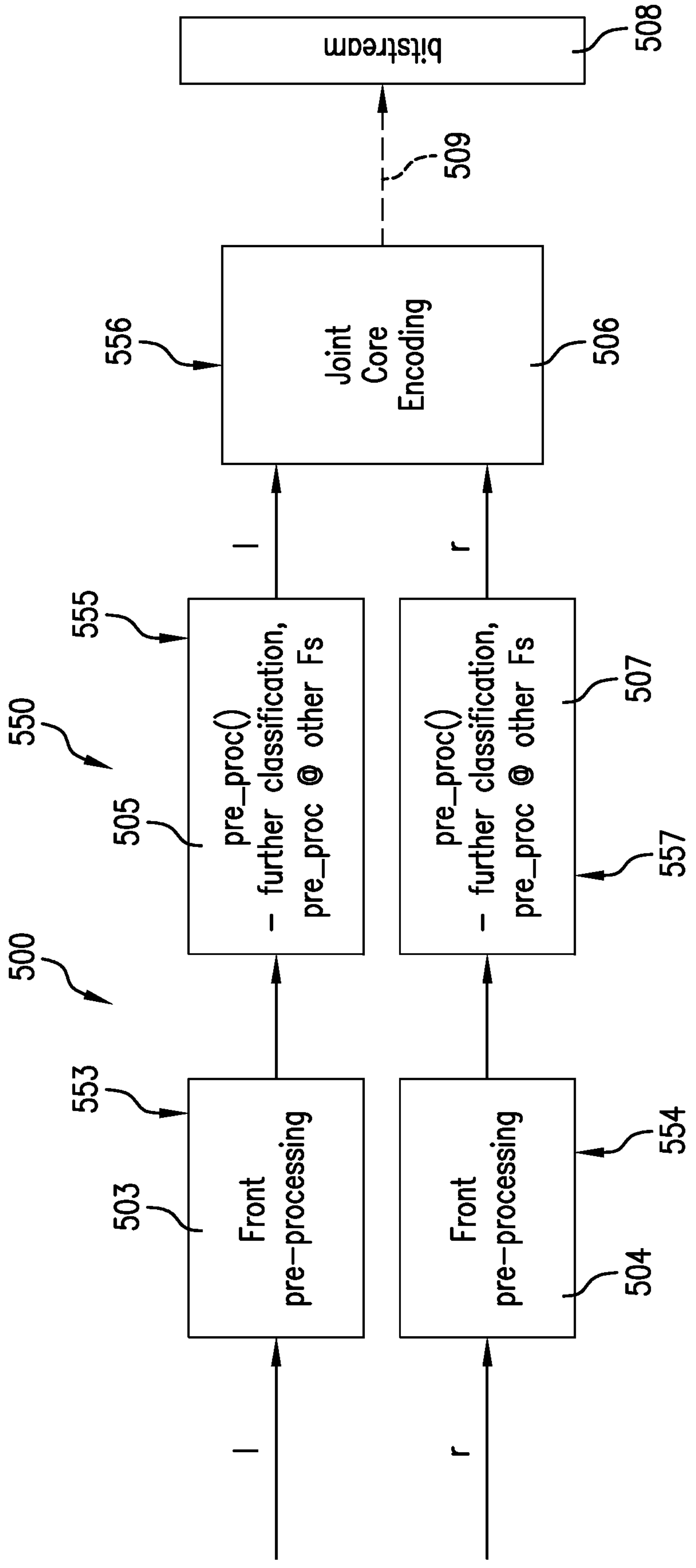
FIG. 5 is a block diagram illustrating concurrently the MDCT stereo encoder of FIG. 2 and the corresponding MDCT stereo encoding method.

FIG. 2 is a high-level block diagram illustrating concurrently the IVAS stereo encoding device 200 and the corresponding IVAS stereo encoding method 250, FIG. 3 is a block diagram illustrating concurrently the FD stereo encoder 300 of the IVAS stereo encoding device 200 of FIG. 2 and the corresponding FD stereo encoding method 350, FIG. 4 is a block diagram illustrating concurrently the TD stereo encoder 400 of the IVAS stereo encoding device 200 of FIG. 2 and the corresponding TD stereo encoding method 450, and FIG. 5 is a block diagram illustrating concurrently the MDCT stereo encoder 500 of the IVAS stereo encoding device 200 of FIG. 2 and the corresponding MDCT stereo encoding method 550.

In the illustrative, non-limitative implementation of FIGS. 2-5, the framework of the IVAS stereo encoding device 200 (and correspondingly the IVAS stereo decoding device 800 of FIG. 8) is based on a modified version of the Enhanced Voice Services (EVS) codec (See Reference [1]). Specifically, the EVS codec is extended to code (and decode) stereo and multi-channels, and address Immersive Voice and Audio Services (IVAS). For that reason, the encoding device 200 and method 250 are referred to as IVAS stereo encoding device and method in the present disclosure. In the described exemplary implementation, the IVAS stereo encoding device 200 and method 250 use, as a non-limitative example, three stereo coding modes: a Frequency-Domain (FD) stereo mode based on DFT (Discrete Fourier Transform), referred to in the present disclosure as "DFT stereo mode", a Time-Domain (TD) stereo mode, referred to in the present disclosure as "TD stereo mode", and a joint stereo coding mode based on the Modified Discrete Cosine Transform (MDCT) stereo mode, referred to in the present disclosure as "MDCT stereo mode". It should be kept in mind that other codec structures may be used as a basis for the framework of the IVAS stereo encoding device 200 (and correspondingly the IVAS stereo decoding device 800).

Stereo mode switching in the IVAS codec (IVAS stereo encoding device 200 and IVAS stereo decoding device 800) refers, in the described, non-limitative implementation, to switching between the DFT, TD and MDCT stereo modes.

1.1 Differences Between the Different Stereo Encoders and Encoding Methods

The following nomenclature is used in the present disclosure and the accompanying figures: small letters indicate time-domain signals, capital letters indicate transform-domain signals, l/L stands for left channel, r/R stands for right channel, m/M stands for mid-channel, s/S stands for side channel, PCh stands for primary channel, and SCh stands for secondary channel. Also, in the figures, numbers without unit correspond to a number of samples at a 16 kHz sampling rate.

Differences exist between (a) the DFT stereo encoder 300 and encoding method 350, (b) the TD stereo encoder 400 and encoding method 450, and (c) the MDCT stereo encoder 500 and encoding method 550. Some of these differences are summarized in the following paragraphs and at least some of them will be better explained in the following description.

The IVAS stereo encoding device 200 and encoding method 250 performs operations such as buffering one 20-ms frame (as well known in the art, the stereo sound signal is processed in successive frames of given duration containing a given number of sound signal samples) of stereo input signal (left and right channels), few classification steps, down-mixing, pre-processing and actual coding. A 8.75 ms look-ahead is available and used mainly for analysis, classification and OverLap-Add (OLA) operations used in transform-domain such as in a Transform Coded eXcitation (TCX) core, a High Quality (HQ) core, and Frequency-Domain BandWidth-Extension (FD-BWE). These operations are described in Reference [1], Clauses 5.3 and 5.2.6.2.

The look-ahead is shorter in the IVAS stereo encoding device 200 and encoding method 250 compared to the non-modified EVS encoder by 0.9375 ms (corresponding to a Finite Impulse Response (FIR) filter resampling delay (See Reference [1], Clause 5.1.3.1). This has an impact on the procedure of resampling the down-processed signal (down-mixed signal for TD and DFT stereo modes) in every frame:

- DFT stereo encoder 300 and encoding method 350: Resampling is performed in the DFT domain and, therefore, introduces no additional delay;
- TD stereo encoder 400 and encoding method 450: FIR resampling (decimation) is performed using the delay of 0.9375 ms. As this resampling delay is not available in the IVAS stereo encoding device 200, the resampling delay is compensated by adding zeroes at the end of the down-mixed signal. Consequently, the 0.9375 ms long compensated part of the down-mixed signal needs to be recomputed (resampled again) at the next frame.

MDCT stereo encoder 500 and encoding method 550: same as in the TD stereo encoder 400 and encoding method 450.

The resampling in the DFT stereo encoder 300, the TD stereo encoder 400 and the MDCT stereo encoder 500, is done from the input sampling rate (usually 16, 32, or 48 kHz) to the internal sampling rate(s) (usually 12.8, 16, 25.6, or 32 kHz). The resampled signal(s) is then used in the pre-processing and the core encoding.

Also, the look-ahead contains a part of down-processed signal (down-mixed signal for TD and DFT stereo modes) signal that is not accurate but rather extrapolated or estimated which also has an impact on the resampling process. The inaccuracy of the look-ahead down-processed signal (down-mixed signal for TD and DFT stereo modes) depends on the current stereo coding mode:

DFT stereo encoder 300 and encoding method 350: The length of 8.75 ms of the look-ahead corresponds to a windowed overlap part of the down-mixed signal related to an OLA part of the DFT analysis window, respectively an OLA part of the DFT synthesis window. In order to perform pre-processing on an as meaningful signal as possible, this look-ahead part of the down-mixed signal is redressed (or unwindowed, i.e. the inverse window is applied to the look-ahead part). As a consequence, the 8.75 ms long redressed down-mixed signal in the look-ahead is not accurately reconstructed in the current frame;

TD stereo encoder 400 and encoding method 450: Before time-domain (TD) down-mixing, an Inter-Channel Alignment (ICA) is performed using an Inter-channel Time Delay (ITD) synchronization between the two input channels l and r in the time-domain. This is achieved by delaying one of the input channels (l or r) and by extrapolating a missing part of the down-mixed signal corresponding to the length of the ITD delay; a maximum value of the ITD delay is 7.5 ms. Consequently, up to 7.5 ms long extrapolated down-mixed signal in the look-ahead is not accurately reconstructed in the current frame.

MDCT stereo encoder 500 and encoding method 550: No down-mixing or time shifting is usually performed, thus the lookahead part of the input audio signal is usually accurate.

The redressed/extrapolated signal part in the look-ahead is not subject to actual coding but used for analysis and classification. Consequently, the redressed/extrapolated, signal part in the look-ahead is re-computed in the next frame and the resulting down-processed signal (down-mixed signal for TD and DFT stereo modes) is then used for actual coding. The length of the re-computed signal depends on the stereo mode and coding processing:

DFT stereo encoder 300 and encoding method 350: The 8.75 ms long signal is subject to re-computation both at the input stereo signal sampling rate and internal sampling rate;

TD stereo encoder 400 and encoding method 450: The 7.5 ms long signal is subject to re-computation at the input stereo signal sampling rate while the 7.5+0.9375=8.4375 ms long signal is subject to re-computation at the internal sampling rate.

MDCT stereo encoder 500 and encoding method 550: Re-computation is usually not needed at the input stereo signal sampling rate while the 0.9375 ms long signal is subject to re-computation at the internal sampling rate.

It is noted that the lengths of the redressed, respectively extrapolated signal part in the look-ahead are mentioned here as an illustration while any other lengths can be implemented in general.

Additional information regarding the DFT stereo encoder 300 and encoding method 350 may be found in References [2] and [3]. Additional information regarding the TD stereo encoder 400 and encoding method 450 may be found in Reference [4]. And additional information regarding the MDCT stereo encoder 500 and encoding method 550 may be found in References [6] and [7].

1.2 Structure of the IVAS Stereo Encoding Device 200 and Processing in the IVAS Stereo Encoding Method 250

The following Table I lists in a sequential order processing operations for each frame depending on the current stereo coding mode (See also FIGS. 2-5).

TABLE I

<table>
<tr><th colspan="3">Processing operations at the IVAS stereo encoding device 200.</th></tr>
<tr><th>DFT stereo mode</th><th>TD stereo mode</th><th>MDCT stereo mode</th></tr>
<tr><td colspan="3">Stereo classification and stereo mode selection</td></tr>
<tr><td colspan="3">Memory allocation/deallocation</td></tr>
<tr><td></td><td>Set TD stereo mode</td><td></td></tr>
<tr><td colspan="3">Stereo mode switching updates</td></tr>
<tr><td></td><td>ICA encoder - time alignment and scaling</td><td></td></tr>
<tr><td colspan="3">TD transient detectors</td></tr>
<tr><td colspan="3">Stereo encoder configuration</td></tr>
<tr><td>DFT analysis</td><td>TD analysis</td><td></td></tr>
<tr><td>Stereo processing and down-mixing in DFT domain</td><td>Weighted down-mixing in TD domain</td><td></td></tr>
<tr><td>DFT synthesis</td><td></td><td></td></tr>
<tr><td colspan="3">Front pre-processing</td></tr>
<tr><td colspan="2">Core encoder configuration</td><td></td></tr>
<tr><td></td><td>TD stereo configuration</td><td></td></tr>
<tr><td>DFT stereo residual coding</td><td></td><td></td></tr>
<tr><td colspan="3">Further pre-processing</td></tr>
<tr><td colspan="2">Core encoding</td><td>Joint stereo coding</td></tr>
<tr><td colspan="3">Common stereo updates</td></tr>
</table>

The IVAS stereo encoding method 250 comprises an operation (not shown) of controlling switching between the DFT, TD and MDCT stereo modes. To perform the switching controlling operation, the IVAS stereo encoding device 200 comprises a controller (not shown) of switching between the DFT, TD and MDCT stereo modes. Switching between the DFT and TD stereo modes in the IVAS stereo encoding device 200 and coding method 250 involves the use of the stereo mode switching controller (not shown) to maintain continuity of the following input signals 1) to 5) to enable adequate processing of these signals in the IVAS stereo encoding device 200 and method 250:

1) the input stereo signal including the left l/L and right r/R channels, used for example for time-domain transient detection or Inter-Channel BWE (IC-BWE);
2) The stereo down-processed signal (down-mixed signal for TD and DFT stereo modes) at the input stereo signal sampling rate:

DFT stereo encoder 300 and encoding method 350: mid-channel m/M;

TD stereo encoder 400 and encoding method 450: Primary Channel (PCh) and Secondary Channel (SCh);

MDCT stereo encoder 500 and encoding method 550: original (no down-mix) left and right channels l and r;

3) Down-processed signal (down-mixed signal for TD and DFT stereo modes) at 12.8 kHz sampling rate—used in pre-processing;

4) Down-processed signal (down-mixed signal for TD and DFT stereo modes) at internal sampling rate—used in core encoding;

5) High-band (HB) input signal—used in BandWidth Extension (BWE).

While it is straightforward to maintain the continuity for signal 1) above, it is challenging for signals 2)-5) due to several aspects, for example a different down-mixing, a different length of the re-computed part of the look-ahead, use of Inter-Channel Alignment (ICA) in the TD stereo mode only, etc.

1.2.1 Stereo Classification and Stereo Mode Selection

The operation (not shown) of controlling switching between the DFT, TD and MDCT stereo modes comprises an operation 255 of stereo classification and stereo mode selection, for example as described in Reference [9], of which the full content is incorporated herein by reference. To perform the operation 255, the controller (not shown) of switching between the DFT, TD and MDCT stereo modes comprises a stereo classifier and stereo mode selector 205.

Switching between the TD stereo mode, the DFT stereo mode, and the MDCT stereo mode is responsive to the stereo mode selection. Stereo classification (Reference [9]) is conducted in response to the left l and right r channels of the input stereo signal, and/or requested coded bit-rate. Stereo mode selection (Reference [9]) consists of choosing one of the DFT, TD, and MDCT stereo modes based on stereo classification.

The stereo classifier and stereo mode selector 205 produces stereo mode signaling 270 for identifying the selected stereo coding mode.

1.2.2 Memory Allocation/Deallocation

The operation (not shown) of controlling switching between the DFT, TD and MDCT stereo modes comprises an operation of memory allocation (not shown). To perform the operation of memory allocation, the controller of switching between the DFT, TD and MDCT stereo modes (not shown) dynamically allocates/deallocates static memory data structures to/from the DFT, TD and MDCT stereo modes depending on the current stereo mode. Such memory allocation keeps the static memory impact of the IVAS stereo encoding device 200 as low as possible by maintaining only those data structures that are employed in the current frame.

For example, in a first DFT stereo frame following a TD stereo frame, the data structures related to the TD stereo mode (for example TD stereo data handling, second core-encoder data structure) are freed (deallocated) and the data structures related to the DFT stereo mode (for example DFT stereo data structure) are instead allocated and initialized. It is noted that the deallocation of the further unused data structures is done first, followed by the allocation of newly used data structures. This order of operations is important to not increase the static memory impact at any point of the encoding.

A summary of main static memory data structures as used in the various stereo modes is shown in Table II.

TABLE II

Allocation of data structures in different stereo modes.

| Data structures | DFT stereo mode | Normal TD stereo mode | LRTD stereo mode | MDCT stereo mode |
|---|---|---|---|---|
| IVAS main structure | X | X | X | X |
| Stereo classifier | X | X | X | X |
| DFT stereo | X | – | – | – |
| TD stereo | – | X | X | – |
| MDCT stereo | – | – | – | X |
| Core-encoder | X | XX | XX | XX |
| ACELP core | X | XX | XX | –– |
| TCX core + IGF | X | X– | X– | XX |
| TD-BWE | X | X | XX | –– |
| FD-BWE | X | X | XX | –– |
| IC-BWE | X | X | – | – |
| ICA | X | X | X | – |

"X" means allocated -- "XX" means twice allocated -- "–" means deallocated and "––" means twice deallocated.

An example implementation of the memory allocation/deallocation encoder module in the C source code is shown below.

```
void stereo_memory_enc(
   CPE_ENC_HANDLE hCPE,          /* i     : CPE encoder structure          */
   const int32_t input_Fs,       /* i     : input sampling rate            */
   const int16_t max_bwidth,     /* i     : maximum audio bandwidth        */
   float *tdm_last_ratio         /* o     : TD stereo last ratio           */
)
{
   Encoder_State *st;
   /*-----------------------------------------------------------------*
    * save parameters from structures that will be freed
    *-----------------------------------------------------------------*/
   if ( hCPE->last_element_mode == IVAS_CPE_TD )
   {
      *tdm_last_ratio = hCPE->hStereoTD->tdm_last_ratio; /* note: this must
be set to local variable before data structures are allocated/deallocated */
   }
   if ( hCPE->hStereoTCA != NULL && hCPE->last_element_mode == IVAS_CPE_DFT
)
   {
      set_s( hCPE->hStereoTCA->prevCorrLagStats, (int16_t) hCPE-
>hStereoDft->itd[1], 3 );
      hCPE->hStereoTCA->prevRefChanIndx = ( hCPE->hStereoDft->itd[1] >= 0 )
? ( L_CH_INDX ) : ( R_CH_INDX );
   }
```

-continued

```
    /*---------------------------------------------------------------*
     * allocate/deallocate data structures
     *---------------------------------------------------------------*/
    if ( hCPE->element_mode != hCPE->last_element_mode )
    {
        /*---------------------------------------------------------------*
         * switching CPE mode to DFT stereo
         *---------------------------------------------------------------*/
        if ( hCPE->element_mode == IVAS_CPE_DFT )
        {
            /* deallocate data structure of the previous CPE mode */
            if ( hCPE->hStereoTD != NULL )
            {
                count_free( hCPE->hStereoTD );
                hCPE->hStereoTD = NULL;
            }
            if ( hCPE->hStereoMdct != NULL )
            {
                count_free( hCPE->hStereoMdct );
                hCPE->hStereoMdct = NULL;
            }
            /* deallocate CoreCoder secondary channel */
            deallocate_CoreCoder_enc( hCPE->hCoreCoder[1] );
            /* allocate DFT stereo data structure */
            stereo_dft_enc_create( &( hCPE->hStereoDft ), input_Fs,
max_bwidth );
            /* allocate ICBWE structure */
            if ( hCPE->hStereoICBWE == NULL )
            {
                hCPE->hStereoICBWE = (STEREO_ICBWE_ENC_HANDLE) count_malloc(
sizeof( STEREO_ICBWE_ENC_DATA ) );
                stereo_icBWE_init_enc( hCPE->hStereoICBWE );
            }
            /* allocate HQ core in M channel */
            st = hCPE->hCoreCoder[0];
            if ( st->hHQ_core == NULL )
            {
                st->hHQ_core = (HQ_ENC_HANDLE) count_malloc( sizeof(
HQ_ENC_DATA ) );
                HQ_core_enc_init( st->hHQ_core );
            }
        }
        /*---------------------------------------------------------------*
         * switching CPE mode to TD stereo
         *---------------------------------------------------------------*/
        if ( hCPE->element_mode == IVAS_CPE_TD )
        {
            /* deallocate data structure of the previous CPE mode */
            if ( hCPE->hStereoDft != NULL )
            {
                stereo_dft_enc_destroy( &( hCPE->hStereoDft ) );
                hCPE->hStereoDft = NULL;
            }
            if ( hCPE->hStereoMdct != NULL )
            {
                count_free( hCPE->hStereoMdct );
                hCPE->hStereoMdct = NULL;
            }
            /* deallocated TCX/IGF structures for second channel */
            deallocate_CoreCoder_TCX_enc( hCPE->hCoreCoder[1] );
            /* allocate TD stereo data structure */
            hCPE->hStereoTD = (STEREO_TD_ENC_DATA_HANDLE) count_malloc(
sizeof( STEREO_TD_ENC_DATA ) );
            stereo_td_init_enc( hCPE->hStereoTD, hCPE->element_brate, hCPE-
>last_element_mode );
            /* allocate secondary channel */
            allocate_CoreCoder_enc( hCPE->hCoreCoder[1] );
        }
        /*---------------------------------------------------------------*
         * allocate DFT/TD stereo structures after MDCT stereo frame
         *---------------------------------------------------------------*/
        if ( hCPE->last_element_mode == IVAS_CPE_MDCT && ( hCPE-element_mode
== IVAS_CPE_DFT || hCPE->element_mode == IVAS_CPE_TD ) )
        {
            /* allocate TCA data structure */
            hCPE->hStereoTCA = (STEREO_TCA_ENC_HANDLE) count_malloc( sizeof(
STEREO_TCA_ENC_DATA ) );
            stereo_tca_init_enc( hCPE->hStereoTCA, input_Fs );
            st = hCPE->hCoreCoder[0];
```

-continued

```
        /* allocate primary channel substructures */
        allocate_CoreCoder_enc( st );
        /* allocate CLDFB for primary channel */
        if ( st->cldfbAnaEnc == NULL )
        {
            openCldfb( &st->cldfbAnaEnc, CLDFB_ANALYSIS, input_Fs,
CLDFB_PROTOTYPE_1_25MS );
        }
        /* allocate BWEs for primary channel */
        if ( st->hBWE_TD == NULL )
        {
            st->hBWE_TD = (TD_BWE_ENC_HANDLE) count_malloc( sizeof(
TD_BWE_ENC_DATA ) );
            if ( st->cldfbSynTd == NULL )
            {
                openCldfb( &st->cldfbSynTd, CLDFB_SYNTHESIS, 16000,
CLDFB_PROTOTYPE_1_25MS );
            }
            InitSWBencBuffer( st->hBWE_TD );
            ResetSHBbuffer_Enc( st->hBWE_TD );
            st->hBWE_FD = (FD_BWE_ENC_HANDLE) count_malloc( sizeof(
FD_BWE_ENC_DATA ) );
            fd_bwe_enc_init( st->hBWE_FD );
        }
    }
    /*--------------------------------------------------------------*
     * switching CPE mode to MDCT stereo
     *--------------------------------------------------------------*/
    if ( hCPE->element_mode == IVAS_CPE_MDCT )
    {
        int16_t i;
        /* deallocate data structure of the previous CPE mode */
        if ( hCPE->hStereoDft != NULL )
        {
            stereo_dft_enc_destroy( &( hCPE->hStereoDft ) );
            hCPE->hStereoDft = NULL;
        }
        if ( hCPE->hStereoTD != NULL )
        {
            count_free( hCPE->hStereoTD );
            hCPE->hStereoTD = NULL;
        }
        if ( hCPE->hStereoTCA != NULL )
        {
            count_free( hCPE->hStereoTCA );
            hCPE->hStereoTCA = NULL;
        }
        if ( hCPE->hStereoICBWE != NULL )
        {
            count_free( hCPE->hStereoICBWE );
            hCPE->hStereoICBWE = NULL;
        }
        for ( i = 0; i < CPE_CHANNELS; i++ )
        {
            st = hCPE->hCoreCoder[i];
            /* deallocate core channel substructures */
            deallocate_CoreCoder_enc( hCPE->hCoreCoder[i] );
        }
        if ( hCPE->last_element_mode == IVAS_CPE_DFT )
        {
            /* allocate secondary channel */
            allocate_CoreCoder_enc( hCPE->hCoreCoder[1] );
        }
        /* allocate TCX/IGF structures for second channel */
        st = hCPE->hCoreCoder[1];
        st->hTcxEnc = (TCX_ENC_HANDLE) count_malloc( sizeof( TCX_ENC_DATA
) );
        st->hTcxEnc->spectrum[0] = st->hTcxEnc->spectrum_long;
        st->hTcxEnc->spectrum[1] = st->hTcxEnc->spectrum_long +
N_TCX10_MAX;
        set_f( st->hTcxEnc->old_out, 0, L_FRAME32k );
        set_f( st->hTcxEnc->spectrum_long, 0, N_MAX );
        if ( hCPE->last_element_mode == IVAS_CPE_DFT )
        {
            st->last_core = ACELP_CORE; /* needed to set-up TCX core in
SetTCXModeInfo ( ) */
        }
        st->hTcxCfg = (TCX_CONFIG_HANDLE) count_malloc( sizeof(
TCX_config ) );
```

-continued

```
        st->hIGFEnc = (IGF_ENC_INSTANCE_HANDLE) count_malloc( sizeof(
IGF_ENC_INSTANCE ) );
        st->igf = getIgfPresent( st->element_mode, st->total_brate, st-
>bwidth, st->rf_mode );
        /* allocate and initialize MDCT stereo structure */
        hCPE->hStereoMdct = (STEREO_MDCT_ENC_DATA_HANDLE) count_malloc(
sizeof( STEREO_MDCT_ENC_DATA ) );
        initMdctStereoEncData( hCPE->hStereoMdct, hCPE->element_brate,
hCPE->hCoreCoder[0]->max_bwidth, SMDCT_MS_DECISION, 0, NULL );
      }
    }
  return;
}
```

1.2.3 Set TD Stereo Mode

The TD stereo mode may consist of two sub-modes. One is a so-called normal TD stereo sub-mode for which the TD stereo mixing ratio is higher than 0 and lower than 1. The other is a so-called LRTD stereo sub-mode for which the TD stereo mixing ratio is either 0 or 1; thus, LRTD is an extreme case of the TD stereo mode where the TD down-mixing actually does not mix the content of the time-domain left l and right r channels to form primary PCh and secondary SCh channels but get them directly from the channels l and r.

When the two sub-modes (normal and LRTD) of the TD stereo mode are available, the stereo mode switching operation (not shown) comprises a TD stereo mode setting (not show). To perform the TD stereo mode setting, forming part of the memory allocation, the stereo mode switching controller (not shown) of the IVAS stereo encoding device 200 allocates/deallocates certain static memory data structures when switching between the normal TD stereo mode and the LRTD stereo mode. For example, an IC-BWE data structure is allocated only in frames using the normal TD stereo mode (See Table II) while several data structures (BWEs and Complex Low Delay Filter Bank (CLDFB) for secondary channel SCh) are allocated only in frames using the LRTD stereo mode (See Table II). An example implementation of the memory allocation/deallocation encoder module in the C source code is shown below:

```
/* normal TD / LRTD switching */
  if ( hCPE->hStereoTD->tdm_LRTD_flag == 0 )
    {
    Encoder_State *st;
    st = hCPE->hCoreCoder[1];
    /* deallocate CLDFB ana for secondary channel */
    if ( st->cldfbAnaEnc != NULL )
    {
      deleteCldfb( &st->cldfbAnaEnc );
    }
    /* deallocate BWEs for secondary channel */
    if ( st->hBWE_TD != NULL )
    {
      if ( st->hBWE_TD != NULL )
      {
        count_free( st->hBWE_TD );
        st->hBWE_TD = NULL;
      }
      deleteCldfb( &st->cldfbSynTd );
      if ( st->hBWE_FD != NULL )
      {
        count_free( st->hBWE_FD );
        st->hBWE_FD = NULL;
      }
      }
    /* allocate ICBWE structure */
    if ( hCPE->hStereoICBWE == NULL )
    {
      ( hCPE->hStereoICBWE =
```

-continued

```
        (STEREO_ICBWE_ENC_HANDLE)
count_malloc( sizeof( STEREO_ICBWE_ENC_DATA ) );
        stereo_icBWE_init_enc( hCPE->hStereoICBWE );
      }
    }
  else /* tdm_LRTD_flag == 1 */
  {
    Encoder_State *st;
    st = hCPE->hCoreCoder[1];
    /* deallocate ICBWE structure */
    if ( hCPE->hStereoICBWE != NULL )
    {
      /* copy past input signal to be used in BWE */
      mvr2r( hCPE->hStereoICBWE->dataChan[1] ,
      hCPE->hCoreCoder[1]-
>old_input_signal, st->input_Fs / 50 );
      count_free( hCPE->hStereoICBWE );
      hCPE->hStereoICBWE = NULL;
    }
    /* allocate CLDFB ana for secondary channel */
    if ( st->cldfbAnaEnc == NULL )
    {
      openCldfb( &st->cldfbAnaEnc, CLDFB_ANALYSIS,
      st->input_Fs,
CLDFB_PROTOTYPE_1_25MS );
    }
    /* allocate BWEs for secondary channel */
    if ( st->hBWE_TD == NULL )
    {
      st->hBWE_TD = (TD_BWE_ENC_HANDLE)
      count_malloc( sizeof(
TD_BWE_ENC_DATA ) );
      openCldfb( &st->cldfbSynTd, CLDFB_SYNTHESIS, 16000,
CLDFB_PROTOTYPE_1_25MS );
      InitSWBencBuffer( st->hBWE_TD );
      ResetSHBbuffer_Enc( st->hBWE_TD );
      st->hBWE_FD = (FD_BWE_ENC_HANDLE)
      count_malloc( sizeof(
FD_BWE_ENC_DATA ) );
      fd_bwe_enc_init( st->hBWE_FD );
    }
  }
```

Mostly, only the normal TD stereo mode (for simplicity referred further only as the TD stereo mode) will be described in detail in the present disclosure. The LRTD stereo mode is mentioned as a possible implementation.

1.2.4 Stereo Mode Switching Updates

The stereo mode switching controlling operation (not shown) comprises an operation of stereo switching updates (not shown). To perform this stereo switching updates operation, the stereo mode switching controller (not shown) updates long-term parameters and updates or resets past buffer memories.

Upon switching from the DFT stereo mode to the TD stereo mode, the stereo mode switching controller (not shown) resets TD stereo and ICA static memory data structures. These data structures store the parameters and memories of the TD stereo analysis and weighted down-mixing (401 in FIG. 4), respectively of the ICA algorithm (201 in FIG. 2). Then the stereo mode switching controller (not shown) sets a TD stereo past frame mixing ratio index according to the normal TD stereo mode or LRTD stereo mode. As a non-limitative illustrative example:

- The previous frame mixing ratio index is set to 15, indicating that the down-mixed mid-channel m/M is coded as the primary channel PCh, where the mixing ratio is 0.5, in the normal TD stereo mode; or
- The previous frame mixing ratio index is set to 31, indicating that the left channel l is coded as the primary channel PCh, in the LRTD stereo mode.

Upon switching from the TD stereo mode to the DFT stereo mode, the stereo mode switching controller (not shown) resets the DFT stereo data structure. This DFT stereo data structure stores parameters and memories related to the DFT stereo processing and down-mixing module (303 in FIG. 3).

Also, the stereo mode switching controller (not shown) transfers some stereo-related parameters between data structures. As an example, parameters related to time shift and energy between the channels l and r, namely a side gain (or ILD parameter) and ITD parameter of the DFT stereo mode are used to update a target gain and correlation lags (ICA parameters 202) of the TD stereo mode and vice versa. These target gain and correlation lags are further described in next Section 1.2.5 of the present disclosure.

Updates/resets related to the core-encoders (See FIGS. 3 and 4) are described later in Section 1.4 of the present disclosure. An example implementation of the handling of some memories in the encoder is shown below.

```
void stereo_switching_enc(
   CPE_ENC_HANDLE hCPE,                  /* i : CPE encoder structure
*/
   float old_input_signal_pri[ ],        /* i : old input signal of primary channel
*/
   const int16_t input_frame             /* i : input frame length
*/
)
{
   int16_t i, n, dft_ovl, offset;
   float tmpF;
   Encoder_State **st;
   st = hCPE->hCoreCoder;
   dft_ovl = STEREO_DFT_OVL_MAX * input_frame / L_FRAME48k;
   /* update DFT analysis overlap memory */
   if ( hCPE->element_mode > IVAS_CPE_DFT && hCPE->input_mem[0] != NULL )
   {
      for ( n = 0; n < CPE_CHANNELS; n++ )
      {
         mvr2r( st[n]->input + input_frame - dft_ovl, hCPE->input_mem[n],
dft_ovl );
      }
   }
   /* TD/MDCT -> DFT stereo switching */
   if ( hCPE->element_mode == IVAS_CPE_DFT && hCPE->last_element_mode ! =
IVAS_CPE_DFT )
   {
      /* window DFT synthesis overlap memory @input_fs, primary channel */
      for ( i = 0; i < dft_ovl; i++ )
      {
         hCPE->hStereoDft->output_mem_dmx[i] =
old_input_signal_pri[input_frame - dft_ovl + i] * hCPE->hStereoDft-
>win[dft_ovl - 1 - i] ;
      }
      /* reset 48kHz BWE overlap memory */
      set_f( hCPE->hStereoDft->output_mem_dmx_32k, 0, STEREO_DFT_OVL_32k );
      stereo_dft_enc_reset( hCPE->hStereoDft );
      /* update ITD parameters */
      if ( hCPE->element_mode == IVAS_CPE_DFT && hCPE->last_element_mode ==
IVAS_CPE_TD )
      {
         set_f( hCPE->hStereoDft->itd, hCPE->hStereoTCA-
>prevCorrLagStats[2], STEREO_DFT_ENC_DFT_NB );
      }
      /* Update the side_gain[ ] parameters */
      if ( hCPE->hStereoTCA != NULL && hCPE->last_element_mode !=
IVAS_CPE_MDCT )
      {
         tmpF = usdequant( hCPE->hStereoTCA->indx_ica_gD,
STEREO_TCA_GDMIN, STEREO_TCA_GDSTEP );
         for ( i = 0; i < STEREO_DFT_BAND_MAX; i++ )
         {
            hCPE->hStereoDft->side_gain[STEREO_DFT_BAND_MAX + i] = tmpF;
         }
      }
      /* do not allow differential coding of DFT side parameters */
      hCPE->hStereoDft->ipd_counter = STEREO_DFT_FEC_THRESHOLD;
      hCPE->hStereoDft->res_pred_counter = STEREO_DFT_FEC_THRESHOLD;
      /* update DFT synthesis overlap memory @12.8kHz */
      for ( i = 0; i < STEREO_DFT_OVL_12k8; i++ )
```

```
        {
            hCPE->hStereoDft->output_mem_dmx_12k8[i] = st[0]-
>buf_speech_enc[L_FRAME32k + L_FRAME - STEREO_DFT_OVL_12k8 + i] * hCPE-
>hStereoDft->win_12k8[STEREO_DFT_OVL_12k8 - 1 - i];
        }
        /* update DFT synthesis overlap memory @16kHz, primary channel only
*/
        lerp( hCPE->hStereoDft->output_mem_dmx, hCPE->hStereoDft-
>output_mem_dmx_16k, STEREO_DFT_OVL_16k, dft_ovl );
        /* reset DFT synthesis overlap memory @8kHz, secondary channel */
        set_f( hCPE->hStereoDft->output_mem_res_8k, 0, STEREO_DFT_OVL_8k );
        hCPE->vad_flag[1] = 0;
    }
    /* DFT/MDCT -> TD stereo switching */
    if ( hCPE->element_mode == IVAS_CPE_TD && hCPE->last_element_mode !=
IVAS_CPE_TD )
    {
        hCPE->hStereoTD->tdm_last_ratio_idx = LRTD_STEREO_MID_IS_PRIM;
        hCPE->hStereoTD->tdm_last_ratio_idx_SM = LRTD_STEREO_MID_IS_PRIM;
        hCPE->hStereoTD->tdm_last_SM_flag = 0;
        hCPE->hStereoTD->tdm_last_inst_ratio_idx = LRTD_STEREO_MID_IS_PRIM;
        /* First frame after DFT frame AND the content is uncorrelated or
xtalk -> the primary channel is forced to left */
        if ( hCPE->hStereoClassif->lrtd_mode == 1 )
        {
            hCPE->hStereoTD->tdm_last_ratio =
ratio_tabl[LRTD_STEREO_LEFT_IS_PRIM];
            hCPE->hStereoTD->tdm_last_ratio_idx = LRTD_STEREO_LEFT_IS_PRIM;
            if ( hCPE->hStereoTCA->instTargetGain < 0.05f && ( hCPE-
>vad_flag[0] || hCPE->vad_flag[1] ) ) /* but if there is no content in the L
channel -> the primary channel is forced to right */
            {
                hCPE->hStereoTD->tdm_last_ratio =
ratio_tabl[LRTD_STEREO_RIGHT_IS_PRIM];
                hCPE->hStereoTD->tdm_last_ratio_idx =
LRTD_STEREO_RIGHT_IS_PRIM;
            }
        }
    }
    /* DFT -> TD stereo switching */
    if ( hCPE->element_mode == IVAS_CPE_TD && hCPE->last_element_mode ==
IVAS_CPE_DFT )
    {
        offset = st[0]->cldfbAnaEnc->p_filter_length - st[0]->cldfbAnaEnc-
>no_channels;
        mvr2r( old_input_signal_pri + input_frame - offset - NS2SA(
input_frame * 50, L_MEM_RECALC_TBE_NS ), st[0]->cldfbAnaEnc->cldfb_state,
offset );
        cldfb_reset_memory( st[0]->cldfbSynTd );
        st[0]->currEnergyLookAhead = 6.1e-5f;
        if ( hCPE->hStereoICBWE == NULL )
        {
            offset = st[1]->cldfbAnaEnc->p_filter_length - st[1]-
>cldfbAnaEnc->no_channels;
            if ( hCPE->hStereoTD->tdm_last_ratio_idx ==
LRTD_STEREO_LEFT_IS_PRIM )
            {
                v_multc( hCPE->hCoreCoder[1]->old_input_signal + input_frame
- offset - NS2SA( input_frame * 50, L_MEM_RECALC_TBE_NS ), -1.0f, st[1]-
>cldfbAnaEnc->cldfb_state, offset );
            }
            else
            {
                mvr2r( hCPE->hCoreCoder[1]->old_input_signal + input_frame -
offset - NS2SA( input_frame * 50, L_MEM_RECALC_TBE_NS ), st[1]->cldfbAnaEnc-
>cldfb_state, offset ) ;
            }
            cldfb_reset_memory( st[1]->cldfbSynTd );
            st[1]->currEnergyLookAhead = 6.1e-5f;
        }
        st[1]->last_extl = -1;
        /* no secondary channel in the previous frame -> memory resets */
        set_zero( st[1]->old_inp_12k8, L_INP_MEM );
        /*set_zero( st[1]->old_inp_16k, L_INP_MEM );*/
        set_zero( st[1]->mem_decim, 2 * L_FILT_MAX );
        /*set_zero( st[1]->mem_decim16k, 2*L_FILT_MAX );*/
        st[1]->mem_preemph = 0;
        /*st[1]->mem_preemph16k = 0;*/
        set_zero( st[1]->buf_speech_enc, L_PAST_MAX_32k + L_FRAME32k +
```

-continued

```
L_NEXT_MAX_32k );
    set_zero( st[1]->buf_speech_enc_pe, L_PAST_MAX_32k + L_FRAME32k +
L_NEXT_MAX_32k );
    if ( st[1]->hTcxEnc != NULL )
    {
      set_zero( st[1 ]->hTcxEnc->buf_speech_ltp, L_PAST_MAX 32k +
L_FRAME32k + L_NEXT_MAX_32k );
    }
    set_zero( st[1]->buf_wspeech_enc, L_FRAME16k + L_SUBFR + L_FRAME16k +
L_NEXT_MAX_16k );
    set_zero( st[1]->buf_synth, OLD_SYNTH_SIZE_ENC + L_FRAME32k );
    st[1]->mem_wsp = 0.0f;
    st[1]->mem_wsp_enc = 0.0f;
    init_gp_clip( st[1]->clip_var );
    set_f( st[1]->Bin_E, 0, L_FFT );
    set_f( st[1]->Bin_E_old, 0, L_FFT / 2 );
    /* st[1]->hLPDmem reset already done in allocation of handles */
    st[1]->last_L_frame = st[0]->last_L_frame;
    pitch_ol_init( &st[1]->old_thres, &st[1]->old_pitch, &st[1]-
>delta_pit, &st[1]->old_corr );
    set_zero( st[1]->old_wsp, L_WSP_MEM );
    set_zero( st[1]->old_wsp2, ( L_WSP_MEM - L INTERPOL ) / OPL_DECIM );
    set_zero( st[1]->mem_decim2, 3 );
    st[1]->Nb_ACELP_frames = 0;
    /* populate PCh memories into the SCh */
    mvr2r( st[0]->hLPDmem->old_exc, st[1]->hLPDmem->old_exc, L_EXC_MEM );
    mvr2r( st[0]->lsf_old, st[1]->lsf_old, M );
    mvr2r( st[0]->lsp_old, st[1]->lsp_old, M );
    mvr2r( st[0]->lsf_old1, st[1]->lsf_old1, M );
    mvr2r( st[0]->lsp_old1, st[1]->lsp_old1, M );
    st[1]->GSC_noisy_speech = 0;
  }
  else if ( hCPE->element_mode == IVAS_CPE_TD && hCPE->last_element_mode ==
IVAS_CPE_MDCT )
  {
    set_f( st[0]->hLPDmem->old_exc, 0.0f, L_EXC_MEM );
    set_f( st[1]->hLPDmem->old_exc, 0.0f, L_EXC_MEM );
  }
```

1.2.5 ICA encoder

In TD stereo frames, the stereo mode switching controlling operation (not shown) comprises a temporal Inter-Channel Alignment (ICA) operation 251. To perform operation 251, the stereo mode switching controller (not shown) comprises an ICA encoder 201 to time-align the channels l and r of the input stereo signal and then scale the channel r.

As described in the foregoing description, before TD down-mixing, ICA is performed using ITD synchronization between the two input channels l and r in the time-domain. This is achieved by delaying one of the input channels (I or r) and by extrapolating a missing part of the down-mixed signal corresponding to the length of the ITD delay; a maximum value of the ITD delay is 7.5 ms. The time alignment, i.e. the ICA time shift, is applied first and alters the most part of the current TD stereo frame. The extrapolated part of the look-ahead down-mixed signal is recomputed and thus temporally adjusted in the next frame based on the ITD estimated in that next frame.

When no stereo mode switching is anticipated, the 7.5 ms long extrapolated signal is re-computed in the ICA encoder 201. However, when stereo mode switching may happen, namely switching from the DFT stereo mode to the TD stereo mode, a longer signal is subject to re-computation. The length then corresponds to the length of the DFT stereo redressed signal plus the FIR resampling delay, i.e. 8.75 ms+0.9375 ms=9.6875 ms. Section 1.4 explains these features in more detail.

Another purpose of the ICA encoder 201 is the scaling of the input channel r. The scaling gain, i.e. the above mentioned the target gain, is estimated as a logarithm ratio of the l and r channels energies smoothed with the previous frame target gain at every frame regardless of the DFT or TD stereo mode being used. The target gain estimated in the current frame (20 ms) is applied to the last 15 ms of the current input channel r while the first 5 ms of the current channel r is scaled by a combination of the previous and current frame target gains in a fade-in/fade-out manner.

The ICA encoder 201 produces ICA parameters 202 such as the ITD delay, the target gain and a target channel index.

1.2.6 Time-Domain Transient Detectors

The stereo mode switching controlling operation (not shown) comprises an operation 253 of detecting time-domain transient in the channel l from the ICA encoder 201. To perform operation 253, the stereo mode switching controller (not shown) comprises a detector 203 to detect time-domain transient in the channel l.

In the same manner, the stereo mode switching controlling operation (not shown) comprises an operation 254 of detecting time-domain transient in the channel r from the ICA encoder 201. To perform operation 254, the stereo mode switching controller (not shown) comprises a detector 204 to detect time-domain transient in the channel r.

Time-domain transient detection in the time-domain channels l and r is a pre-processing step that enables detection and, therefore proper processing and encoding of such transients in the transform-domain core encoding modules (TCX core, HQ core, FD-BWE).

Further information regarding the time-domain transient detectors 203 and 204 and the time-domain transient detection operations 253 and 254 can be found, for example, in Reference [1], Clause 5.1.8.

1.2.7 Stereo Encoder Configurations

To perform stereo encoder configurations, the IVAS stereo encoding device 200 sets parameters of the stereo encoders 300, 400 and 500. For example, a nominal bit-rate for the core-encoders is set.

1.2.8 DFT Analysis, Stereo Processing and Down-Mixing in DFT Domain, and IDFT Synthesis Referring to FIG. 3, the DFT stereo encoding method 350 comprises an operation 351 for applying a DFT transform to the channel l from the time-domain transient detector 203 of FIG. 2. To perform operation 351, the DFT stereo encoder 300 comprises a calculator 301 of the DFT transform of the channel l (DFT analysis) to produce a channel L in DFT domain.

The DFT stereo encoding method 350 also comprises an operation 352 for applying a DFT transform to the channel r from the time-domain transient detector 204 of FIG. 2. To perform operation 352, the DFT stereo encoder 300 comprises a calculator 302 of the DFT transform of the channel r (DFT analysis) to produce a channel R in DFT domain.

The DFT stereo encoding method 350 further comprises an operation 353 of stereo processing and down-mixing in DFT domain. To perform operation 353, the DFT stereo encoder 300 comprises a stereo processor and down-mixer 303 to produce side information on a side channel S. Down-mixing of the channels L and R also produces a residual signal on the side channel S. The side information and the residual signal from side channel S are coded, for example, using a coding operation 354 and a corresponding encoder 304, and then multiplexed in an output bit-stream 310 of the DFT stereo encoder 300. The stereo processor and down-mixer 303 also down-mixes the left L and right R channels from the DFT calculators 301 and 302 to produce mid-channel M in DFT domain. Further information regarding the operation 353 of stereo processing and down-mixing, the stereo processor and down-mixer 303, the mid-channel M and the side information and residual signal from side channel S can be found, for example, in Reference [3].

In an inverse DFT (IDFT) synthesis operation 355 of the DFT stereo encoding method 350, a calculator 305 of the DFT stereo encoder 300 calculates the IDFT transform m of the mid-channel M at the sampling rate of the input stereo signal, for example 12.8 kHz. In the same manner, in an inverse DFT (IDFT) synthesis operation 356 of the DFT stereo encoding method 350, a calculator 306 of the DFT stereo encoder 300 calculates the IDFT transform m the channel M at the internal sampling rate.

1.2.9 TD Analysis and Down-Mixing in TD Domain

Referring to FIG. 4, the TD stereo encoding method 450 comprises an operation 451 of time domain analysis and weighted down-mixing in TD domain. To perform operation 451, the TD stereo encoder 400 comprises a time domain analyzer and down-mixer 401 to calculate stereo side parameters 402 such as a sub-mode flag, mixing ratio index, or linear prediction reuse flag, which are multiplexed in an output bit-stream 410 of the TD stereo encoder 400. The time domain analyzer and down-mixer 401 also performs weighted down-mixing of the channels l and r from the detectors 203 and 204 (FIG. 2) to produce the primary channel PCh and secondary channel SCh using an estimated mixing ratio, in alignment with the ICA scaling. Further information regarding the time-domain analyzer and down-mixer 401 and the operation 451 can be found, for example, in Reference [4].

Down-mixing using the current frame mixing ratio is performed for example on the last 15 ms of the current frame of the input channels l and r while the first 5 ms of the current frame is down-mixed using a combination of the previous and current frame mixing ratios in a fade-in/fade-out manner to smooth the transition from one channel to the other. The two channels (primary channel PCh and secondary channel SCh) sampled at the stereo input channel sampling rate, for example 32 kHz, are resampled using FIR decimation filters to their representations at 12.8 kHz, and at the internal sampling rate.

In the TD stereo mode, it is not only the stereo input signal of the current frame which is down-mixed. Also, stored down-mixed signals that correspond to the previous frame are down-mixed again. The length of the previous signal subject to this re-computation corresponds to the length of the time-shifted signal re-computed in the ICA module, i.e. 8.75 ms+0.9375 ms=9.6875 ms.

1.2.10 Front Pre-Processing

In the IVAS codec (IVAS stereo encoding device 200 and IVAS stereo decoding device 800), there is a restructuration of the traditional pre-processing such that some classification decisions are done on the codec overall bit-rate while other decisions are done depending on the core-encoding bit-rate. Consequently, the traditional pre-processing, as used for example in the EVS codec (Reference [1]), is split into two parts to ensure that the best possible codec configuration is used in each processed frame. Thus, the codec configuration can change from frame to frame while certain changes of configuration can be made as fast as possible, for example those based on signal activity or signal class. On the other hand, some changes in codec configuration should not happen too often, for example selection of coded audio bandwidth, selection of internal sampling rate or bit-budget distribution between low-band and high-band coding; too frequent changes in such codec configuration can lead to unstable coded signal quality or even audible artifacts.

The first part of the pre-processing, the front pre-processing, may include pre-processing and classification modules such as resampling at the pre-processing sampling rate, spectral analysis, Band-Width Detection (BWD), Sound Activity Detection (SAD), Linear Prediction (LP) analysis, open-loop pitch search, signal classification, speech/music classification. It is noted that the decisions in the front pre-processing depend exclusively on the overall codec bit-rate. Further information regarding the operations performed during the above described pre-processing can be found, for example, in Reference [1].

In the DFT stereo mode (DFT stereo encoder 300 of FIG. 3), front pre-processing is performed by a front pre-processor 307 and the corresponding front pre-processing operation 357 on the mid-channel m in time domain at the internal sampling rate from IDFT calculator 306.

In the TD stereo mode, the front pre-processing is performed by (a) a front pre-processor 403 and the corresponding front pre-processing operation 453 on the primary channel PCh from the time domain analyzer and down-mixer 401, and (b) a front pre-processor 404 and the corresponding front pre-processing operation 454 on the secondary channel SCh from the time domain analyzer and down-mixer 401.

In the MDCT stereo mode, the front pre-processing is performed by a front pre-processor 503 and the corresponding front pre-processing operation 553 on the input left channel l from the time domain transient detector 203 (FIG. 2), and (b) a front pre-processor 504 and the corresponding front pre-processing operation 554 on the input right channel r from the time domain transient detector 204 (FIG. 2).

1.2.11 Core-Encoder Configuration

Configurations of the core-encoder(s) is made on the basis of the codec overall bit-rate and front pre-processing.

Specifically, in the DFT stereo encoder 300 and the corresponding DFT stereo encoding method 350 (FIG. 3), a core-encoder configurator 308 and the corresponding core-encoder configuration operation 358 are responsive to the mid-channel m in time domain from the IDFT calculator 305 and the output from the front pre-processor 307 to configure the core-encoder 311 and corresponding core-encoding operation 361. The core-encoder configurator 308 is responsible for example of setting the internal sampling rate and/or modifying the core-encoder type classification. Further information regarding the core-encoder configuration in the DFT domain can be found, for example, in References [1] and [2].

In the TD stereo encoder 400 and the corresponding TD stereo encoding method 450 (FIG. 4), a core-encoders configurator 405 and the corresponding core-encoders configuration operation 455 are responsive to the front pre-processed primary channel PCh and secondary channel SCh from the front pre-processors 403 and 404, respectively, to perform configuration of the core-encoder 406 and corresponding core-encoding operation 456 of the primary channel PCh and the core-encoder 407 and corresponding core-encoding operation 457 of the secondary channel SCh. The core-encoder configurator 405 is responsible for example of setting the internal sampling rate and/or modifying the core-encoder type classification. Further information regarding core-encoders configuration in the TD domain can be found, for example, in References [1] and [4].

1.2.12 Further Pre-Processing

The DFT encoding method 350 comprises an operation 362 of further pre-processing. To perform operation 362, a so-called further pre-processor 312 of the DFT stereo encoder 300 conducts a second part of the pre-processing that may include classification, core selection, pre-processing at encoding internal sampling rate, etc. The decisions in the front pre-processor 307 depend on the core-encoding bit-rate which usually fluctuates during a session. Additional information regarding the operations performed during such further pre-processing in DFT domain can be found, for example, in Reference [1].

The TD encoding method 450 comprises an operation 458 of further pre-processing. To perform operation 458, a so-called further pre-processor 408 of the TD stereo encoder 400 conducts, prior to core-encoding the primary channel PCh, a second part of the pre-processing that may include classification, core selection, pre-processing at encoding internal sampling rate, etc. The decisions in the further pre-processor 408 depend on the core-encoding bit-rate which usually fluctuates during a session.

Also, the TD encoding method 450 comprises an operation 459 of further pre-processing. To perform operation 459, the TD stereo encoder 400 comprises a so-called further pre-processor 409 to conduct, prior to core-encoding the secondary channel SCh, a second part of the pre-processing that may include classification, core selection, pre-processing at encoding internal sampling rate, etc. The decisions in the further pre-processor 409 depend on the core-encoding bit-rate which usually fluctuates during a session.

Additional information regarding such further pre-processing in the TD domain can be found, for example, in Reference [1].

The MDCT encoding method 550 comprises an operation 555 of further pre-processing of the left channel l. To perform operation 555, a so-called further pre-processor 505 of the MDCT stereo encoder 500 conducts a second part of the pre-processing of the left channel l that may include classification, core selection, pre-processing at encoding internal sampling rate, etc., prior to an operation 556 of joint core-encoding of the left channel l and the right channel r performed by the joint core-encoder 506 of the MDCT stereo encoder 500.

The MDCT encoding method 550 comprises an operation 557 of further pre-processing of the right channel r. To perform operation 557, a so-called further pre-processor 507 of the MDCT stereo encoder 500 conducts a second part of the pre-processing of the left channel l that may include classification, core selection, pre-processing at encoding internal sampling rate, etc., prior to the operation 556 of joint core-encoding of the left channel l and the right channel r performed by the joint core-encoder 506 of the MDCT stereo encoder 500.

Additional information regarding such further pre-processing in the MDCT domain can be found, for example, in Reference [1].

1.2.13 Core-Encoding

In general, the core-encoder 311 in the DFT stereo encoder 300 (performing the core-encoding operation 361) and the core-encoders 406 (performing the core-encoding operation 456) and 407 (performing the core-encoding operation 457) in the TD stereo encoder 400 can be any variable bit-rate mono codec. In the illustrative implementation of the present disclosure, the EVS codec (See Reference [1]) with fluctuating bit-rate capability (See Reference [5]) is used. Of course, other suitable codecs may be possibly considered and implemented. In the MDCT stereo encoder 500, the joint core-encoder 506 is employed which can be in general a stereo coding module with stereophonic tools that processes and quantizes the l and r channels in a joint manner.

1.2.14 Common Stereo Updates

Finally, common stereo updates are performed. Further information regarding common stereo updates may be found, for example, in Reference [1].

1.2.15 Bit-Streams

Referring to FIGS. 2 and 3, the stereo mode signaling 270 from the stereo classifier and stereo mode selector 205, a bit-stream 313 from the side information, residual signal encoder 304, and a bit-stream 314 from the core-encoder 311 are multiplexed to form the DFT stereo encoder bit stream 310 (then forming an output bit-stream 206 of the IVAS stereo encoding device 200 (FIG. 2)).

Referring to FIGS. 2 and 4, the stereo mode signaling 270 from the stereo classifier and stereo mode selector 205, the side parameters 402 from the time-domain analyzer and down-mixer 401, the ICA parameters 202 from the ICA encoder 201, a bit-stream 411 from the core-encoder 406 and a bit-stream 412 from the core-encoder 407 are multiplexed to form the TD stereo encoder bit-stream 410 (then forming the output bit-stream 206 of the IVAS stereo encoding device 200 (FIG. 2)).

Referring to FIGS. 2 and 5, the stereo mode signaling 270 from the stereo classifier and stereo mode selector 205, and a bit-stream 509 from the joint core-encoder 506 are multiplexed to form the MDCT stereo encoder bit-stream 508 (then forming the output bit-stream 206 of the IVAS stereo encoding device 200 (FIG. 2)).

1.3 Switching from the TD Stereo Mode to the DFT Stereo Mode in the IVAS Stereo Encoding Device 200

Figure 6:
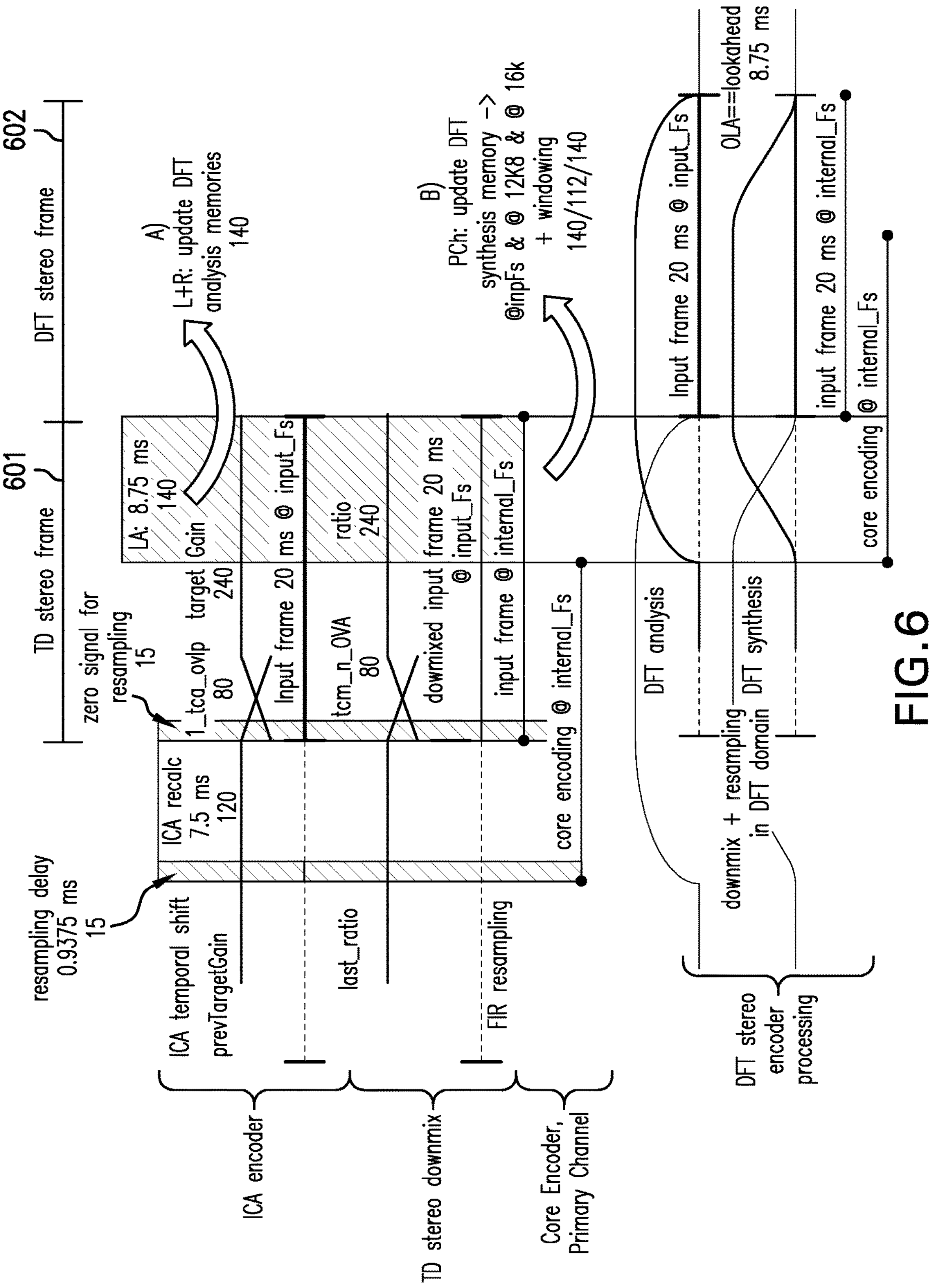
FIG. 6 is a flow chart illustrating processing operations in the IVAS stereo encoding device and method upon switching from a TD stereo mode to a DFT stereo mode.

Switching from the TD stereo mode (TD stereo encoder 400) to the DFT stereo mode (DFT stereo encoder 300) is relatively straightforward as illustrated in FIG. 6.

Specifically, FIG. 6 is a flow chart illustrating processing operations in the IVAS stereo encoding device 200 and method 250 upon switching from the TD stereo mode to the DFT stereo mode. As can be seen, FIG. 5 shows two frames of stereo input signal, i.e. a TD stereo frame 601 followed by a DFT stereo frame 602, with different processing operations and related time instances when switching from the TD stereo mode to the DFT stereo mode.

A sufficiently long look-ahead is available, resampling is done in the DFT domain (thus no FIR decimation filter memory handling), and there is a transition from two core-encoders 406 and 407 in the last TD stereo frame 501 to one core-encoder 311 in the first DFT stereo frame 502.

The following operations performed upon switching from the TD stereo mode (TD stereo encoder 400) to the DFT stereo mode (DFT stereo encoder 300) are performed by the above mentioned stereo mode switching controller (not shown) in response to the stereo mode selection.

The instance A) of FIG. 6 refers to an update of the DFT analysis memory, specifically the DFT stereo OLA analysis memory as part of the DFT stereo data structure which is subject to windowing prior to the DFT calculating operations 351 and 352. This update is done by the stereo mode switching controller (not shown) before the Inter-Channel Alignment (ICA) (See 251 in FIG. 2) and comprises storing samples related to the last 8.75 ms of the current TD stereo frame 601 of the channels l and r of the input stereo signal. This update is done every TD stereo frame in both channels l and r. Further information regarding the DFT analysis memory may be found, for example, in References [1] and [2].

The instance B) of FIG. 6 refers to an update of the DFT synthesis memory, specifically the OLA synthesis memory as part of the DFT stereo data structure which results from windowing after the IDFT calculating operations 355 and 356, upon switching from the TD stereo mode to the DFT stereo mode. The stereo mode switching controller (not shown) performs this update in the first DFT stereo frame 602 following the TD stereo frame 601 and uses, for this update, the TD stereo memories as part of the TD stereo data structure and used for the TD stereo processing corresponding to the down-mixed primary channel PCh. Further information regarding the DFT synthesis memory may be found, for example, in References [1] and [2], and further information regarding the TD stereo memories may be found, for example, in Reference [4].

Starting with the first DFT stereo frame 602, certain TD stereo related data structures, for example the TD stereo data structure (as used in the TD stereo encoder 400) and a data structure of the core-encoder 407 related to the secondary channel SCh, are no longer needed and, therefore, are de-allocated, i.e. freed by the stereo mode switching controller (not shown).

In the DFT stereo frame 602 following the TD stereo frame 601, the stereo mode switching controller (not shown) continues the core-encoding operation 361 in the core-encoder 311 of the DFT stereo encoder 300 with memories of the primary PCh channel core-encoder 406 (e.g. synthesis memory, pre-emphasis memory, past signals and parameters, etc.) in the preceding TD stereo frame 601 while controlling time instance differences between the TD and DFT stereo modes to ensure continuity of several core-encoder buffers, e.g. pre-emphasized input signal buffers, HB input buffers, etc. which are later used in the low-band encoder, resp. the FD-BWE high-band encoder. Further information regarding the core-encoding operation 361, memories of the PCh channel core-encoder 406, pre-emphasized input signal buffers, HB input buffers, etc. may be found, for example, in Reference [1].

1.4 Switching from the DFT Stereo Mode to the TD Stereo Mode in the IVAS Stereo Encoding Device 200

Switching from the DFT stereo mode to the TD stereo mode is more complicated than switching from the TD stereo mode to the DFT stereo mode, due to the more complex structure of the TD stereo encoder 400. The following operations performed upon switching from the DFT stereo mode (DFT stereo encoder 300) to the TD stereo mode (TD stereo encoder 400) are performed by the stereo mode switching controller (not shown) in response to the stereo mode selection.

Figures 1, 7A:
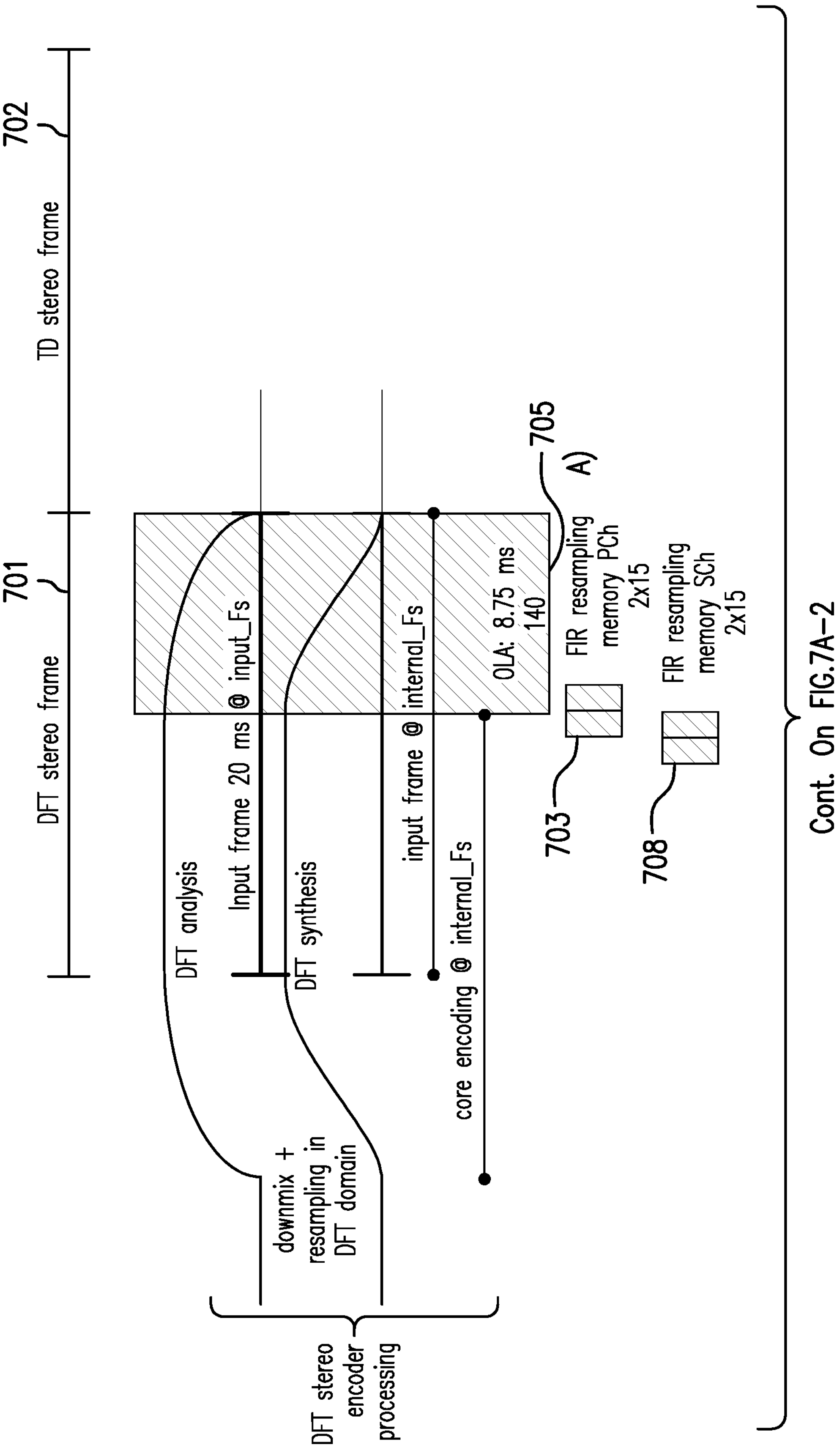
FIG. 7*a* is a flow chart illustrating processing operations in the IVAS stereo encoding device and method upon switching from the DFT stereo mode to the TD stereo mode.
Figures 2, 7A:
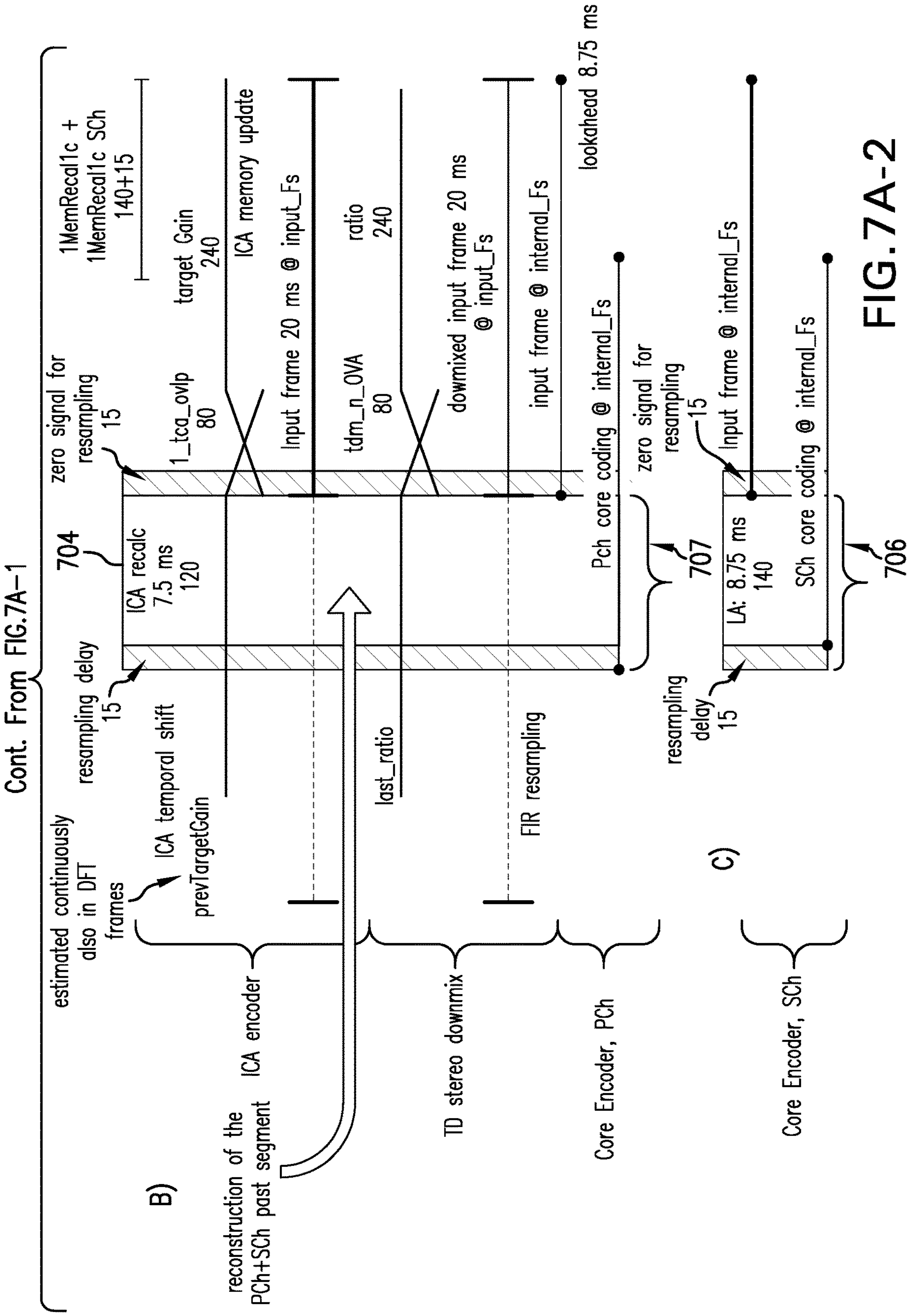
Figure 7B:
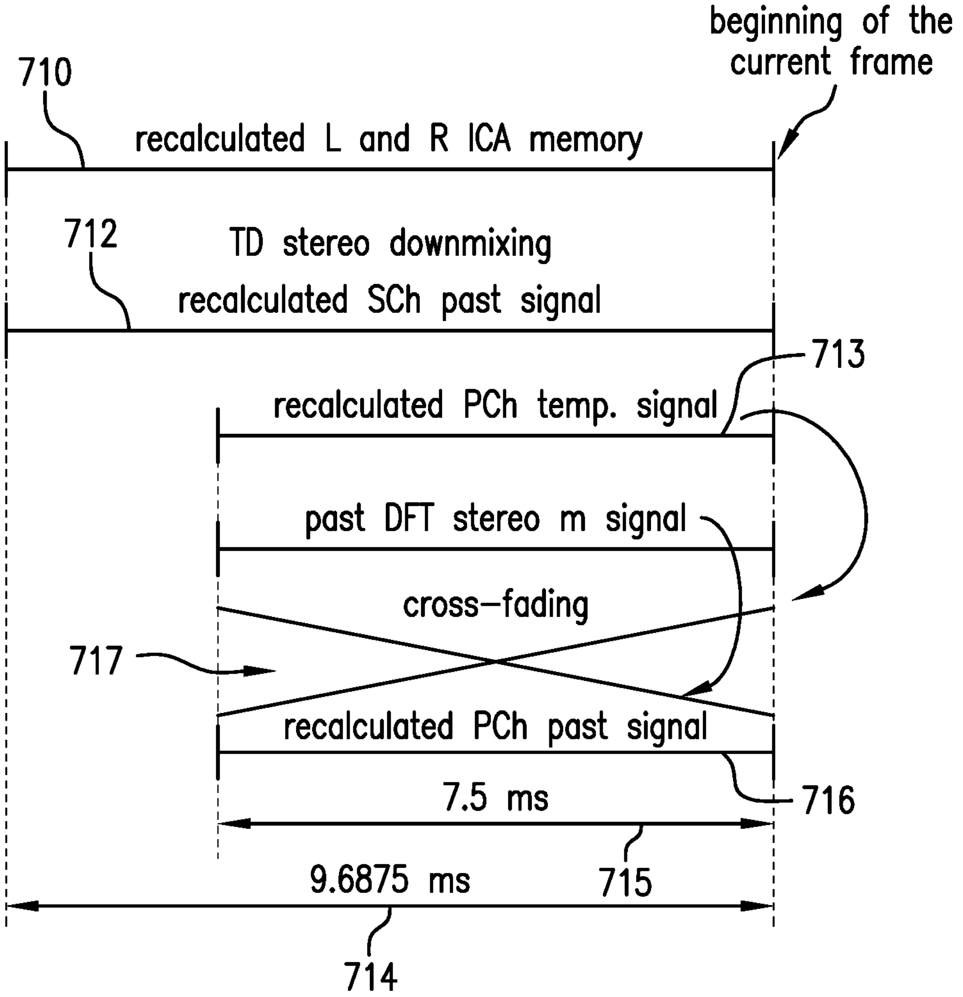
FIG. 7*b* is a flow chart illustrating processing operations related to TD stereo past signals upon switching from the DFT stereo mode to the TD stereo mode.

FIG. **7*a* is a flow chart illustrating processing operations in the IVAS stereo encoding device 200 and method 250 upon switching from the DFT stereo mode to the TD stereo mode. In particular, FIG. 7*a* shows two frames of the stereo input signal, i.e. a DFT stereo frame 701 followed by a TD stereo frame 702**, at different processing operations with related time instances when switching from the DFT stereo mode to the TD stereo mode.

The instance A) of FIG. **7*a* refers to the update of the FIR resampling filter memory (as employed in the FIR resampling from the input stereo signal sampling rate to the 12.8 kHz sampling rate and to the internal core-encoder sampling rate) used in the primary channel PCh of the TD stereo coding mode. The stereo mode switching controller (not shown) performs this update in every DFT stereo frame using the down-mixed mid-channel m and corresponds to a 2×0.9375 ms long segment 703 before the last 7.5 ms long segment in the DFT stereo frame 701 (See 704**), thereby ensuring continuity of the FIR resampling memory for the primary channel PCh.

Since the side channels (FIG. 3) of the DFT stereo encoding method 350 is not available though it is used at, for example, the 12.8 kHz sampling rate, at the input stereo signal sampling rate and at the internal sampling rate, the stereo mode switching controller (not shown) populates the FIR resampling filter memory of the down-mixed secondary channel SCh differently. In order to reconstruct the full length of the down-mixed signal at the internal sampling rate for the core-encoder 407, a 8.75 ms segment (See 705) of the down-mixed signal of the previous frame is recomputed in the TD stereo frame 702. Thus, the update of the down-mixed secondary channel SCh FIR resampling filter memory corresponds to a 2×0.9375 ms long segment 708 of the down-mixed mid-channel m before the last 8.75 ms long segment (See 705); this is done in the first TD stereo frame 702 after switching from the preceding DFT stereo frame 701. The secondary channel SCh FIR resampling filter memory update is referred to by instance C) in FIG. **7*a*. As can be seen, the stereo mode switching controller (not shown) re-computes in the TD stereo frame a length (See 706) of the down-mixed signal which is longer in the secondary channel SCh with respect to the recomputed length of the down-mixed signal in the primary channel PCh (See 707**).

Instance B) in FIG. **7*a* relates to updating (re-computation) of the primary PCh and secondary SCh channels in the first TD stereo frame 702 following the DFT stereo frame 701. The operations of instance B) as performed by the stereo mode switching controller (not shown) are illustrated in more detail in FIG. 7*b*. As mentioned in the foregoing description, FIG. 7*b*** is a flow chart illustrating processing operations upon switching from the DFT stereo mode to the TD stereo mode.

Referring to FIG. **7*b*, in an operation 710, the stereo mode switching controller (not shown) recalculates the ICA memory as used in the ICA analysis and computation (See operation 251 in FIG. 2) and later as input signal for the pre-processing and core-encoders (See operations 453-454 and 456-459) of length of 9.6875 ms (as discussed in Sections 1.2.7-1.2.9 of the present disclosure) of the channels l and r corresponding to the previous DFT stereo frame 701**.

Thus, in operations 712 and 713, the stereo mode switching controller (not shown) recalculates the primary PCh and secondary SCh channels of the DFT stereo frame 701 by down-mixing the ICA-processed channels l and r using a stereo mixing ratio of that frame 701.

For the secondary channel SCh, the length (See 714) of the past segment to be recalculated by the stereo mode switching controller (not shown) in operation 712 is 9.6875 ms although a segment of length of only 7.5 ms (See 715) is recalculated when there is no stereo coding mode switching. For the primary channel PCh (See operation 713), the length of the segment to be recalculated by the stereo mode switching controller (not shown) using the TD stereo mixing ratio of the past frame 701 is always 7.5 ms (See 715). This ensures continuity of the primary PCh and secondary SCh channels.

A continuous down-mixed signal is employed when switching from mid-channel m of the DFT stereo frame 701 to the primary channel PCh of the TD stereo frame 702. For that purpose, the stereo mode switching controller (not shown) cross-fades (717) the 7.5 ms long segment (See 715) of the DFT mid-channel m with the recalculated primary channel PCh (713) of the DFT stereo frame 701 in order to smooth the transition and to equalize for different down-mix signal energy between the DFT stereo mode and the TD stereo mode. The reconstruction of the secondary channel SCh in operation 712 uses the mixing ratio of the frame 701 while no further smoothing is applied because the secondary channel SCh from the DFT stereo frame 701 is not available.

Core-encoding in the first TD stereo frame 702 following the DFT stereo frame 701 then continues with resampling of the down-mixed signals using the FIR filters, pre-emphasizing these signals, computation of HB signals, etc. Further information regarding these operations may be found, for example, in Reference [1].

With respect to the pre-emphasis filter implemented as a first-order high-pass filter used to emphasize higher frequencies of the input signal (See Reference [1], Clause 5.1.4), the stereo mode switching controller (not shown) stores two values of the pre-emphasis filter memory in every DFT stereo frame. These memory values correspond to time instances based on different re-computation length of the DFT and TD stereo modes. This mechanism ensures an optimal re-computation of the pre-emphasis signal in the channel m respectively the primary channel PCh with a minimal signal length. For the secondary channel SCh of the TD stereo mode, the pre-emphasis filter memory is set to zero before the first TD stereo frame is processed.

Starting with the first TD stereo frame 702 following the DFT stereo frame 701, certain DFT stereo related data structures (e.g. DFT stereo data structure mentioned herein above) are not needed, so they are deallocated/freed by the stereo mode switching controller (not shown). On the other hand, a second instance of the core-encoder data structure is allocated and initialized for the core-encoding (operation 457) of the secondary channel SCh. The majority of the secondary channel SCh core-encoder data structures are reset though some of them are estimated for smoother switching transitions. For example, the previous excitation buffer (adaptive codebook of the ACELP core), previous LSF parameters and LSP parameters (See Reference [1]) of the secondary channel SCh are populated from their counterparts in the primary channel PCh. Reset or estimation of the secondary channel SCh previous buffers may be a source of a number of artifacts. While many of such artifacts are significantly suppressed in smoothing-based processes at the decoder, few of them might remain a source of subjective artifacts.

1.5 Switching from the TD Stereo Mode to the MDCT Stereo Mode in the IVAS Stereo Encoding Device 200

Switching from the TD stereo mode to the MDCT stereo mode is relatively straightforward because both these stereo modes handle two input channels and employ two core-encoder instances. The main obstacle is to maintain the correct phase of the input left and right channels.

In order to maintain the correct phase of the input left and right channels of the stereo sound signal, the stereo mode switching controller (not shown) alters TD stereo down-mixing. In the last TD stereo frame before the first MDCT stereo frame, the TD stereo mixing ratio is set to β=1.0 and an opposite-phase down-mixing of the left and right channels of the stereo sound signal is implemented using, for example, the following formula for the TD stereo down-mixing:

$$\mathrm{PCh}(i)=r(i)\cdot(1-\beta)+l(i)\cdot\beta$$

$$\mathrm{SCh}(i)=l(i)\cdot(1-\beta)+r(i)\cdot\beta$$

where PCh(i) is the TD primary channel, SCh(i) is the TD secondary channel, l(i) is the left channel, r(i) is the right channel, β is the TD stereo mixing ratio, and i is the discrete time index.

In turn, this means that the TD stereo primary channel PCh(i) is identical to the MDCT stereo past left channel $l_{past}(i)$ and the TD stereo secondary channel SCh(i) is identical to the MDCT stereo past right channel $r_{past}(i)$ where i is the discrete time index. For completeness, it is noted that the stereo mode switching controller (not shown) may use in the last TD stereo frame a default TD stereo down-mixing using for example the following formula:

$$\mathrm{PCh}(i)=r(i)\cdot(1-\beta)+l(i)\cdot\beta$$

$$\mathrm{SCh}(i)=l(i)\cdot(1-\beta)-r(i)\cdot\beta$$

Next, in usual (no stereo mode switching) MDCT stereo processing, the front pre-processing (front pre-processors 503 and 504 and front pre-processing operations 553 and 554) does not recompute the look-ahead of the left l and right r channels of the stereo sound signal except for its last 0.9375 ms long segment. However, in practice, the look-ahead of the length of 7.5+0.9375 ms is subject to re-computation at the internal sampling rate (12.8 kHz in this non-limitative illustrative implementation). Thus, no specific handling is needed to maintain the continuity of input signals at the input sampling rate.

Then, in usual (no stereo mode switching) MDCT stereo processing, the further pre-processing (further pre-processors 505 and 507 and front pre-processing operations 555 and 557) does not recompute the look-ahead of the left l and right r channels of the stereo sound signal except of its last 0.9375 ms long segment. In contrast with the front pre-processing, the input signals (left l and right r channels of the stereo sound signal) at the internal sampling rate (12.8 kHz in this non-limitative illustrative implementation) of a length of only 0.9375 ms are recomputed in the further pre-processing.

In other words:

The MDCT stereo encoder 500 comprises (a) front pre-processors 503 and 504 which, in the second MDCT stereo mode, recompute the look-ahead of first duration of the left l and right r channels of the stereo sound signal at the internal sampling rate, and (b) further pre-processors which, in the second MDCT stereo mode, recompute a last segment of given duration of the look-ahead of the left l and right r channels of the stereo sound signal at the internal sampling rate, wherein the first and second durations are different.

The MDCT stereo coding operation 550 comprises, in the second MDCT stereo mode, (a) recomputing the look-ahead of first duration of the left l and right r channels of the stereo sound signal at the internal sampling rate, and (b) recomputing a last segment of given duration of the look-ahead of the left l and right r channels of the stereo sound signal at the internal sampling rate, wherein the first and second durations are different.

1.6 Switching from the MDCT Stereo Mode to the TD Stereo Mode in the IVAS Stereo Encoding Device 200

Similarly to the switching from the TD stereo mode to the MDCT stereo mode, two input channels are always available and two core-encoder instances are always employed in this scenario. The main obstacle is again to maintain the correct phase of the input left and right channels. Thus, in the first TD stereo frame after the last MDCT stereo frame, the stereo mode switching controller (not shown) sets the TD stereo mixing ratio to β=1.0 and alters TD stereo down-mixing by using the opposite-phase mixing scheme similarly as described in Section 1.5.

Another specific about the switching from the MDCT stereo mode to the TD stereo mode is that the stereo mode switching controller (not shown) properly reconstructs in the first TD frame the past segment of input channels of the stereo sound signal at the internal sampling rate. Thus, a part of the look-ahead corresponding to 8.75−7.5=1.25 ms is reconstructed (resampled and pre-emphasized) in the first TD stereo frame.

1.7 Switching from the DFT Stereo Mode to the MDCT Stereo Mode in the IVAS Stereo Encoding Device 200

A mechanism similar to the switching from the DFT stereo mode to the TD stereo mode as described above is used in this scenario, wherein the primary PCh and secondary SCh channels of the TD stereo mode are replaced by the left l and right r channels of the MDCT stereo mode.

1.8 Switching from the MDCT Stereo Mode to the DFT Stereo Mode in the IVAS Stereo Encoding Device 200

A mechanism similar to the switching from the TD stereo mode to the DFT stereo mode as described above is used in this scenario, wherein the primary PCh and secondary SCh channels of the TD stereo mode are replaced by the left l and right r channels of the MDCT stereo mode.

2. Switching Between Stereo Modes in the IVAS Stereo Decoding Device 800 and Method 850

Figure 8:
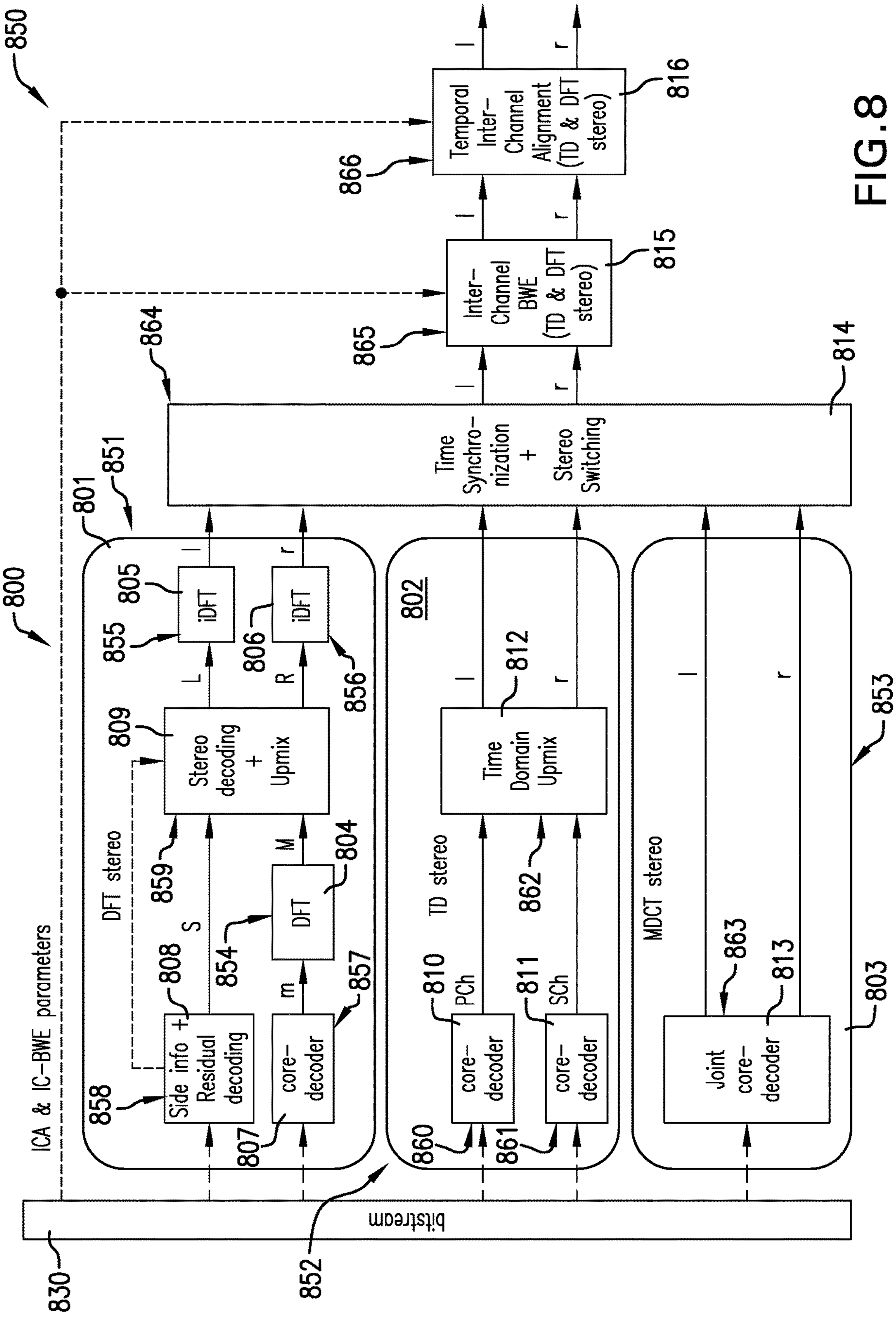
FIG. 8 is a high-level block diagram illustrating concurrently an IVAS stereo decoding device and the corresponding decoding method, wherein the IVAS stereo decoding device comprise a DFT stereo decoder, a TD stereo decoder, and MDCT stereo decoder.

FIG. 8 is a high-level block diagram illustrating concurrently an IVAS stereo decoding device 800 and the corresponding decoding method 850, wherein the IVAS stereo decoding device 800 comprises a DFT stereo decoder 801 and the corresponding DFT stereo decoding method 851, a TD stereo decoder 802 and the corresponding TD stereo decoding method 852, and a MDCT stereo decoder 803 and the corresponding MDCT stereo decoding method 853. For simplicity, only DFT, TD and MDCT stereo modes are shown and described; however, it is within the scope of the present disclosure to use and implement other types of stereo modes.

The IVAS stereo decoding device 800 and corresponding decoding method 850 receive a bit-stream 830 transmitted from the IVAS stereo encoding device 200. Generally speaking, the IVAS stereo decoding device 800 and corresponding decoding method 850 decodes, from the bit-stream 830, successive frames of a coded stereo signal, for example 20-ms long frames as in the case of the EVS codec, performs an up-mixing of the decoded frames, and finally produces a stereo output signal including channels l and r.

2.1 Differences Between the Different Stereo Decoders and Decoding Methods

Core-decoding, performed at the internal sampling rate, is basically the same regardless of the actual stereo mode; however, core-decoding is done once (mid-channel m) for a DFT stereo frame and twice for a TD stereo frame (primary PCh and secondary SCh channels) or for a MDCT stereo frame (left l and right r channels). An issue is to maintain (update) memories of the secondary channel SCh of a TD stereo frame when switching from a DFT stereo frame to a TD stereo frame, resp. to maintain (update) memories of the r channel of a MDCT stereo frame when switching from a DFT stereo frame to a MDCT stereo frame.

Moreover, further decoding operations after core-decoding strongly depend on the actual stereo mode which consequently complicates switching between the stereo modes. The most fundamental differences are the following:

DFT stereo decoder 801 and decoding method 851:

- Resampling of the decoded core synthesis from the internal sampling rate to the output stereo signal sampling rate is done in the DFT domain with a DFT analysis and synthesis overlap window length of 3.125 ms.
- The low-band (LB) bass post-filtering (in ACELP frames) adjustment is done in the DFT domain.
- The core switching (ACELP core <-> TCX/HQ core) is done in the DFT domain with an available delay of 3.125 ms.
- Synchronization between the LB synthesis and the HB synthesis (in ACELP frames) requires no additional delay.
- Stereo up-mixing is done in the DFT domain with an available delay of 3.125 ms.
- Time synchronization to match an overall decoder delay (which is 3.25 ms) is applied with a length of 0.125 ms.

TD stereo decoder 802 and decoding method 852: (Further information regarding the TD stereo decoder may be found, for example, in Reference [4])

- Resampling of the decoded core synthesis from the internal sampling rate to the output stereo signal sampling rate is done using the CLDFB filters with a delay of 1.25 ms.
- The LB bass post-filtering (in ACELP frames) adjustment is done in the CLDFB domain.
- The core switching (ACELP core <-> TCX/HQ core) is done in the time domain with an available delay of 1.25 ms.
- Synchronization between the LB synthesis and the HB synthesis (in ACELP frames) introduces an additional delay.
- Stereo up-mixing is done in the TD domain with a zero delay.
- Time synchronization to match an overall decoder delay is applied with a length of 2.0 ms.

MDCT stereo decoder 803 and decoding method 853:

- Only a TCX based core decoder is employed, so only a 1.25 ms delay adjustment is used to synchronize core synthesis signals between different cores.

The LB bass post-filtering (in ACELP frames) is skipped.

The core switching (ACELP core <-> TCX/HQ core) is done in the time domain only in the first MDCT stereo frame after the TD or DFT stereo frame with an available delay of 1.25 ms.

Synchronization between the LB synthesis and the HB synthesis is irrelevant.

Stereo up-mixing is skipped.

Time synchronization to match an overall decoder delay is applied with a length of 2.0 ms.

The different operations during decoding, mainly the DFT "vs" TD domain processing, and the different delay schemes between the DFT stereo mode and the TD stereo mode are carefully taken into consideration in the herein below described procedure for switching between the DFT and TD stereo modes.

2.2 Processing in the IVAS Stereo Decoding Device 800 and Decoding Method 850

The following Table III lists in a sequential order the processing operations in the IVAS stereo decoding device 800 for each frame depending on the current DFT, TD or MDCT stereo mode (See also FIG. 8).

TABLE III

Processing steps in the IVAS stereo decoding device 800

| DFT stereo mode | TD stereo mode | MDCT stereo mode |
|---|---|---|
| Read stereo mode & audio bandwidth information | | |
| Memory allocation | | |
| Stereo mode switching updates | | |
| Stereo decoder configuration | | |
| Core decoder configuration | | |
| | TD stereo decoder configuration | |
| Core decoding | | Joint stereo decoding |
| Core switching in DFT domain | Core switching in TD domain | |
| | Update of DFT stereo mode overlap memories Update MDCT stereo TCX overlap buffer | Reset/update of DFT stereo overlap memories |
| DFT analysis DFT stereo decoding incl. residual decoding | | |
| Up-mixing in DFT domain DFT synthesis | Up-mixing in TD domain | |
| Synthesis synchronization | | |
| IC-BWE, addition of HB synthesis | | |
| ICA decoder - temporal adjustment | | |
| Common stereo updates | | |

The IVAS stereo decoding method 850 comprises an operation (not shown) of controlling switching between the DFT, TD and MDCT stereo modes. To perform the switching controlling operation, the IVAS stereo decoding device 800 comprises a controller (not shown) of switching between the DFT, TD and MDCT stereo modes. Switching between the DFT, TD and MDCT stereo modes in the IVAS stereo decoding device 800 and decoding method 850 involves the use of the stereo mode switching controller (not shown) to maintain continuity of the following several decoder signals and memories 1) to 6) to enable adequate processing of these signals and use of said memories in the IVAS stereo decoding device 800 and method 850:

1) Down-mixed signals and memories of core post-filters at the internal sampling rate, used at core-decoding;
   - DFT stereo decoder 801: mid-channel m;
   - TD stereo decoder 802: primary channel PCh and secondary channel SCh;
   - MDCT stereo decoder 803: left channel l and right channel r (not down-mixed).
2) TCX-LTP (Transform Coded eXcitation—Long Term Prediction) post-filter memories. The TCX-LTP post-filter is used to interpolate between past synthesis samples using polyphase FIR interpolation filters (See Reference [1], Clause 6.9.2);
3) DFT OLA analysis memories at the internal sampling rate and at the output stereo signal sampling rate as used in the OLA part of the windowing in the previous and current frames before the DFT operation 854;
4) DFT OLA synthesis memories as used in the OLA part of the windowing in the previous and current frames after the IDFT operations 855 and 856 at the output stereo signal sampling rate;
5) Output stereo signal, including channels l and r; and
6) HB signal memories (See Reference [1], Clause 6.1.5), channels l and r—used in BWEs and IC-BWE.

While it is relatively straightforward to maintain the continuity for one channel (mid-channel m in the DFT stereo mode, respectively primary channel PCh in the TD stereo mode or l channel in the MDCT stereo mode) in item 1) above, it is challenging for the secondary channel SCh in item 1) above and also for signals/memories in items 2)-6) due to several aspects, for example completely missing past signal and memories of the secondary channel SCh, a different down-mixing, a different default delay between DFT stereo mode and TD stereo mode, etc. Also, a shorter decoder delay (3.25 ms) when compared to the encoder delay (8.75 ms) further complicates the decoding process.

2.2.1 Reading Stereo Mode and Audio Bandwidth Information

The IVAS stereo decoding method 850 starts with reading (not shown) the stereo mode and audio bandwidth information from the transmitted bit-stream 830. Based on the currently read stereo mode, the related decoding operations are performed for each particular stereo mode (see Table III) while memories and buffers of the other stereo modes are maintained.

2.2.2 Memory Allocation

Similarly as the IVAS stereo encoding device 200, in a memory allocation operation (not shown), the stereo mode switching controller (not shown) dynamically allocates/deallocates data structures (static memory) depending on the current stereo mode. The stereo mode switching controller (not shown) keeps the static memory impact of the codec as low as possible by maintaining only those parts of the static memory that are used in the current frame. Reference is made to Table II for summary of data structures allocated in a particular stereo mode.

In addition, a LRTD stereo sub-mode flag is read by the stereo mode switching controller (not shown) to distinguish between the normal TD stereo mode and the LRTD stereo mode. Based on the sub-mode flag, the stereo mode switching controller (not shown) allocates/deallocates related data structures within the TD stereo mode as shown in Table II.

2.2.3 Stereo Mode Switching Updates

Similarly as the IVAS stereo encoding device 200, the stereo mode switching controller (not shown) handles memories in case of switching from one the DFT, TD, and MDCT stereo modes to another stereo mode. This keeps updated long-term parameters and updates or resets past buffer memories.

Upon receiving a first DFT stereo frame following a TD stereo frame or MDCT stereo frame, the stereo mode switching controller (not shown) performs an operation of resetting the DFT stereo data structure (already defined in relation to the DFT stereo encoder 300). Upon receiving a first TD stereo frame following a DFT or MDCT stereo frame, the stereo mode switching controller performs an operation of resetting the TD stereo data structure (already described in relation to the TD stereo decoder 400). Finally, upon receiving a first MDCT stereo frame following a DFT or TD stereo frame, the stereo mode switching controller (not shown) performs an operation of resetting the MDCT stereo data structure. Again, upon switching from one the DFT and TD stereo modes to the other stereo mode, the stereo mode switching controller (not shown) performs an operation of transferring some stereo-related parameters between data structures as described in relation to the IVAS stereo encoding device 200 (See above Section 1.2.4).

Updates/resets related to the secondary channel SCh of core-decoding are described in Section 2.4.

Also, further information about the operations of stereo decoder configuration, core-decoder configuration, TD stereo decoder configuration, core-decoding, core switching in DFT domain, core-switching in TD domain in Table III may be found, for example, in References [1] and [2].

2.2.4 Update of DFT Stereo Mode Overlap Memories

The stereo mode switching controller (not shown) maintains or updates the DFT OLA memories in each TD or MDCT stereo frame (See "Update of DFT stereo mode overlap memories", "Update MDCT stereo TCX overlap buffer" and "Reset/update of DFT stereo overlap memories" of Table III). In this manner, updated DFT OLA memories are available for a next DFT stereo frame. The actual maintaining/updating mechanism and related memory buffers are described later in Section 2.3 of the present disclosure. An example implementation of updating of the DFT stereo OLA memories performed in TD or MDCT stereo frames in the C source code is given below.

```
if ( st[n]->element_mode != IVAS_CPE_DFT )
{
   ivas_post_proc( ... );
   /* update OLA buffers - needed for switching to DFT stereo */
   stereo_td2dft_update( hCPE, n, output[n], synth[n], hb_synth[n],
output_frame );
   /* update ovl buffer for possible switching from TD stereo SCh ACELP
frame to MDCT stereo TCX frame */
   if ( st[n]->element_mode == IVAS_CPE_TD && n == 1 && st[n]->hTcxDec ==
NULL )
   {
      mvr2r( output[n] + st[n]->L_frame / 2, hCPE->hStereoTD-
>TCX_old_syn_Overl, st[n]->L_frame / 2 );
   }
}
void stereo_td2dft_update(
   CPE_DEC_HANDLE hCPE,          /* i/o    : CPE decoder structure     */
   const int16_t n,              /* i      : channel number            */
   float output[ ],              /* i/o    : synthesis @internal Fs    */
   float synth[ ],               /* i/o    : synthesis @output Fs      */
   float hb_synth[ ],            /* i/o    : hb synthesis              */
   const int16_t output_frame    /* i      : frame length              */
)
{
   int16_t ovl, ovl_TCX, dft32ms_ovl, hq_delay_comp;
   Decoder_State **st;
   /* initialization */
   st = hCPE->hCoreCoder;
   ovl = NS2SA( st[n]->L_frame * 50, STEREO_DFT32MS_OVL_NS );
   dft32ms_ovl = ( STEREO_DFT32MS_OVL_MAX * st[0]->output_Fs ) / 48000;
   hq_delay_comp = NS2SA( st[0]->output_Fs, DELAY_CLDFB_NS );
   if ( hCPE->element_mode >= IVAS_CPE_DFT && hCPE->element_mode !=
IVAS_CPE_MDCT )
   {
      if ( st[n]->core == ACELP_CORE )
      {
         if ( n == 0 )
         {
            /* update DFT analysis overlap memory @internal_fs: core
synthesis */
            mvr2r( output + st[n]->L_frame - ovl, hCPE->input_mem_LB[n],
ovl ) ;
            /* update DFT analysis overlap memory @internal_fs: BPF */
            if ( st[n]->p_bpf_noise_buf )
            {
               mvr2r( st[n]->p_bpf_noise_buf + st[n]->L_frame - ovl,
hCPE->input_mem_BPF[n], ovl );
            }
            /* update DFT analysis overlap memory @output_fs: BWE */
            if ( st[n]->extl != -1 || ( st[n]->bws_cnt > 0 && st[n]->core
== ACELP_CORE ) )
            {
               mvr2r( hb_synth + output_frame - dft32ms_ovl, hCPE-
>input_mem[n], dft32ms_ovl );
```

-continued

```
            }
        }
        else
        {
            /* update DFT analysis overlap memory @internal_fs: core
synthesis, secondary channel */
            mvr2r( output + st[n]->L_frame - ovl, hCPE->input_mem_LB[n],
ovl ) ;
        }
    }
    else /* TCX core */
    {
        /* LB-TCX synthesis */
        mvr2r( output + st[n]->L_frame - ovl, hCPE->input_mem_LB[n], ovl
);
        /* BPF */
        if ( n == 0 && st[n]->p_bpf_noise_buf )
        {
            mvr2r( st[n]->p_bpf_noise_buf + st[n]->L_frame - ovl, hCPE-
>input_mem_BPF[n], ovl ) ;
        }
        /* TCX synthesis (it was already delayed in TD stereo in
core_switching_post_dec( )) */
        if ( st[n]->hTcxDec != NULL )
        {
            ovl_TCX = NS2SA( st[n]-hTcxDec->L_frameTCX * 50,
STEREO_DFT32MS_OVL_NS );
            mvr2r( synth + st[n]->hTcxDec->L_frameTCX + hq_delay_comp -
ovl_TCX, hCPE->input_mem[n], ovl_TCX - hq_delay_comp ) ;
            mvr2r( st[n]->delay_buf_out, hCPE->input_mem[n] + ovl_TCX -
hq_delay_comp, hq_delay_comp );
            }
        }
    }
    else if ( hCPE->element_mode == IVAS_CPE_MDCT && hCPE->input_mem[0] !=
NULL )
    {
        /* reset DFT stereo OLA memories */
        set_zero( hCPE->input_mem[n], NS2SA( st[0]->output_Fs,
STEREO_DFT32MS_OVL_NS ) ) ;
        set_zero ( hCPE->input_mem_LB[n], STEREO_DFT32MS_OVL_16k );
        if ( n == 0 )
        {
            set_zero ( hCPE->input_mem_BPF[n], STEREO_DFT32MS_OVL_16k );
        }
    }
    return;
}
```

2.2.5 DFT Stereo Decoder 801 and Decoding Method 851

The DFT decoding method 851 comprises an operation 857 of core decoding the mid-channel m. To perform operation 857, a core-decoder 807 decodes in response to the received bit-stream 830 the mid-channel m in time domain. The core-decoder 807 (performing the core-decoding operation 857) in the DFT stereo decoder 801 can be any variable bit-rate mono codec. In the illustrative implementation of the present disclosure, the EVS codec (See Reference [1]) with fluctuating bit-rate capability (See Reference [5]) is used. Of course, other suitable codecs may be possibly considered and implemented.

In a DFT calculating operation 854 of the DFT decoding method 851 (DFT analysis of Table III), a calculator 804 computes the DFT of the mid-channel m to recover mid-channel M in the DFT domain.

The DFT decoding method 851 also comprises an operation 858 of decoding stereo side information and residual signal S (residual decoding of Table III). To perform operation 858, a decoder 808 is responsive to the bit-stream 830 to recover the stereo side information and residual signal S.

In a DFT stereo decoding (DFT stereo decoding of Table III) and up-mixing (up-mixing in DFT domain of Table III) operation 859, a DFT stereo decoder and up-mixer 809 produces the channels L and R in the DFT domain in response to the mid-channel M and the side information and residual signal S. Generally speaking, the DFT stereo decoding and up-mixing operation 859 is the inverse to the DFT stereo processing and down-mixing operation 353 of FIG. 3.

In IDFT calculating operation 855 (DFT synthesis of Table III), a calculator 805 calculates the IDFT of channel L to recover channel l in time domain. Likewise, in IDFT calculating operation 856 (DFT synthesis of Table III), a calculator 806 calculates the IDFT of channel R to recover channel r in time domain.

2.2.6 TD Stereo Decoder 802 and Decoding Method 852

The TD decoding method 852 comprises an operation 860 of core-decoding the primary channel PCh. To perform operation 860, a core-decoder 810 decodes in response to the received bit-stream 830 the primary channel PCh.

The TD decoding method 852 also comprises an operation 861 of core-decoding the secondary channel SCh. To perform operation 861, a core-decoder 811 decodes in response to the received bit-stream 830 the secondary channel SCh.

Again, the core-decoder 810 (performing the core-decoding operation 860 in the TD stereo decoder 802) and the core-decoder 811 (performing the core-decoding operation 861 in the TD stereo decoder 802) can be any variable bit-rate mono codec. In the illustrative implementation of the present disclosure, the EVS codec (See Reference [1]) with fluctuating bit-rate capability (See Reference [5]) is used. Of course, other suitable codecs may be possibly considered and implemented.

In a time domain (TD) up-mixing operation 862 (up-mixing in TD domain of Table III), an up-mixer 812 receives and up-mixes the primary PCh and secondary SCh channels to recover the time-domain channels l and r of the stereo signal based on the TD stereo mixing factor.

2.2.7 MDCT Stereo Decoder 803 and Decoding Method 853

The MDCT decoding method 853 comprises an operation 863 of joint core-decoding (joint stereo decoding of Table III) the left channel l and the right channel r. To perform operation 863, a joint core-decoder 813 decodes in response to the received bit-stream 830 the left channel l and the right channel r. It is noted that no up-mixing operation is performed and no up-mixer is employed in the MDCT stereo mode.

2.2.8 Synthesis Synchronization

To perform a stereo synthesis time synchronization (synthesis synchronization of Table III) and stereo switching operation 864, the stereo mode switching controller (not shown) comprises a time synchronizer and stereo switch 814 to receive the channels l and r from the DFT stereo decoder 801, the TD stereo decoder 802 or the MDCT stereo decoder 803 and to synchronize the up-mixed output stereo channels l and r. The time synchronizer and stereo switch 814 delays the up-mixed output stereo channels l and r to match the codec overall delay value and handles transitions between the DFT stereo output channels, the TD stereo output channels and the MDCT stereo output channels.

By default, in the DFT stereo mode, the time synchronizer and stereo switch 814 introduces a delay of 3.125 ms at the DFT stereo decoder 801. In order to match the codec overall delay of 32 ms (frame length of 20 ms, encoder delay of 8.75 ms, decoder delay of 3.25 ms), a delay synchronization of 0.125 ms is applied by the time synchronizer and stereo switch 814. In case of the TD or MDCT stereo mode, the time synchronizer and stereo switch 814 applies a delay consisting of the 1.25 ms resampling delay and the 2 ms delay used for synchronization between the LB and HB synthesis and to match the overall codec delay of 32 ms.

After time synchronization and stereo switching (See the synthesis time synchronization and stereo switching operation 864 and time synchronizer and stereo switch 814 of FIG. 8) are performed, the HB synthesis (from BWE or IC-BWE) is added to the core synthesis (IC-BWE, addition of HB synthesis of Table See also in FIG. 8 BWE or IC-BWE calculation operation 865 and BWE or IC-BWE calculator 815) and ICA decoding (ICA decoder—temporal adjustment of Table III which desynchronize two output channels l and r) is performed before the final stereo synthesis of the channels l and r is outputted from the IVAS stereo decoding device 800 (See temporal ICA operation 866 and corresponding ICA decoder 816). These operations 865 and 866 are skipped in the MDCT stereo mode.

Finally, as shown in Table III, common stereo updates are performed.

2.3 Switching from the TD Stereo Mode to the DFT Stereo Mode at the IVAS Stereo Decoding Device Further information regarding the elements, operations and signals mentioned in section 2.3 and 2.4 may be found, for example, in References [1] and [2].

The mechanism of switching from the TD stereo mode to the DFT stereo mode at the IVAS stereo decoding device 800 is complicated by the fact that the decoding steps between these two stereo modes are fundamentally different (see above Section 2.1 for details) including a transition from two core-decoders 810 and 811 in the last TD stereo frame to one core-decoder 807 in the first DFT stereo frame.

Figure 9:
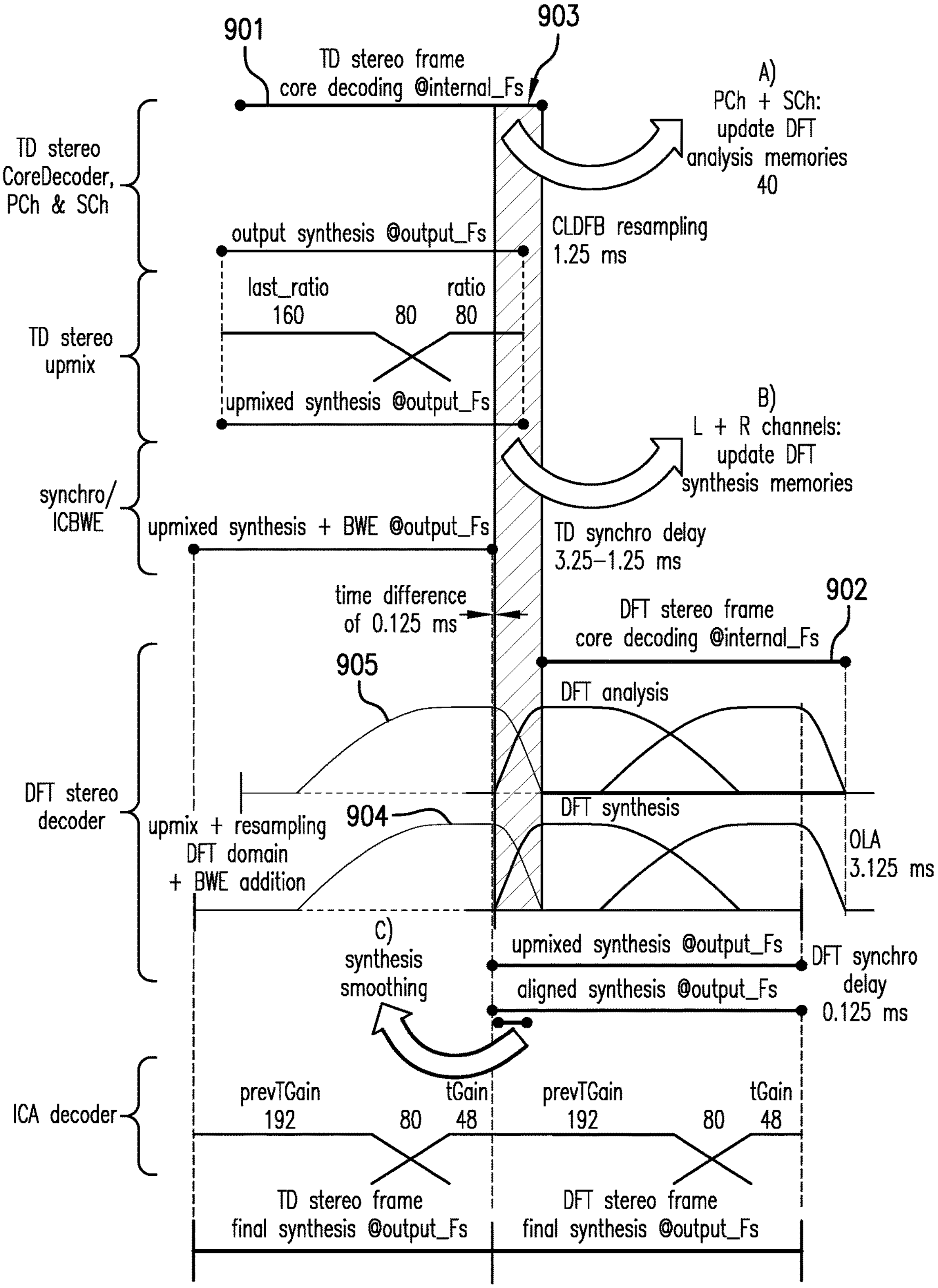
FIG. 9 is a flow chart illustrating processing operations in the IVAS stereo decoding device and method upon switching from the TD stereo mode to the DFT stereo mode.

FIG. 9 is a flow chart illustrating processing operations in the IVAS stereo decoding device 800 and method 850 upon switching from the TD stereo mode to the DFT stereo mode. Specifically, FIG. 9 shows two frames of the decoded stereo signal at different processing operations with related time instances when switching from a TD stereo frame 901 to a DFT stereo frame 902.

First, the core-decoders 810 and 811 of the TD stereo decoder 802 are used for both the primary PCh and secondary SCh channels and each output the corresponding decoded core synthesis at the internal sampling rate. In the TD stereo frame 901, the decoded core synthesis from the two core-decoders 810 and 811 is used to update the DFT stereo OLA memory buffers (one memory buffer per channel, i.e. two OLA memory buffers in total; See above described DFT OLA analysis and synthesis memories). These OLA memory buffers are updated in every TD stereo frame to be up-to-date in case the next frame is a DFT stereo frame.

The instance A) of FIG. 9 refers to, upon receiving a first DFT stereo frame 902 following a TD stereo frame 901, an operation (not shown) of updating the DFT stereo analysis memories (these are used in the OLA part of the windowing in the previous and current frame before the DFT calculating operation 854) at the internal sampling rate, input_mem_LB[ ], using the stereo mode switching controller (not shown). For that purpose, a number $L_{ovl}$ of last samples 903 of the TD stereo synthesis at the internal sampling rate of the primary channel PCh and the secondary channel SCh in the TD stereo frame 901 are used by the stereo mode switching controller (not shown) to update the DFT stereo analysis memories of the DFT stereo mid-channel m and the side channel s, respectively. The length of the overlap segment 903, $L_{ovl}$, corresponds to the 3.125 ms long overlap part of the DFT analysis window 905, e.g. $L_{ovl}$=40 samples at a 12.8 kHz internal sampling rate.

Similarly, the stereo mode switching controller (not shown) updates the DFT stereo Bass Post-Filter (BPF) analysis memory (which is used in the OLA part of the windowing in the previous and current frame before the DFT calculating operation 854) of the mid-channel m at the internal sampling rate, input_mem_BPF[ ], using $L_{ovl}$ last samples of the BPF error signal (See Reference [1], Clause 6.1.4.2) of the TD primary channel PCh. Moreover, the DFT stereo Full Band (FB) analysis memory (this memory is used in the OLA part of the windowing in the previous and current frame before the DFT calculating operation 854) of the mid-channel m at the output stereo signal sampling rate, input_mem[ ], is updated using the 3.125 ms last samples of the TD stereo PCh HB synthesis (ACELP core) respectively PCh TCX synthesis. The DFT stereo BPF and FB analysis memories are not employed for the side information channel s, so that these memories are not updated using the secondary channel SCh core synthesis.

Next, in the TD stereo frame 901, the decoded ACELP core synthesis (primary PCh and secondary SCh channels) at the internal sampling rate is resampled using CLDFB-domain filtering which introduces a delay of 1.25 ms. In case of the TCX/HQ core frame, a compensation delay of 1.25 ms is used to synchronize the core synthesis between different cores. Then the TCX-LTP post-filter is applied to both core channels PCh and SCh.

At the next operation, the primary PCh and secondary SCh channels of the TD stereo synthesis at the output stereo signal sampling rate from the TD stereo frame 901 are subject to TD stereo up-mixing (combination of the primary PCh and secondary SCh channels using the TD stereo mixing ratio in TD up-mixer 812 (See Reference [4]) resulting in up-mixed stereo channels l and r in the time-domain. Since the up-mixing operation 862 is performed in the time-domain, it introduces no up-mixing delay.

Then, the left l and right r up-mixed channels of the TD stereo frame 901 from the up-mixer 812 of the TD stereo decoder 802 are used in an operation (not shown) of updating the DFT stereo synthesis memories (these are used in the OLA part of the windowing in the previous and current frame after the IDFT calculating operation 855). Again, this update is done in every TD stereo frame by the stereo mode switching controller (not shown) in case the next frame is a DFT stereo frame. Instance B) of FIG. 9 depicts that the number of available last samples of the TD stereo left l and right r channels synthesis is insufficient to be used for a straightforward update of the DFT stereo synthesis memories. The 3.125 ms long DFT stereo synthesis memories are thus reconstructed in two segments using approximations. The first segment corresponds to the (3.125-1.25) ms long signal that is available (that is the up-mixed synthesis at the output stereo signal sampling rate) while the second segment corresponds to the remaining 1.25 ms long signal that is not available due to the core-decoder resampling delay.

Figure 10:
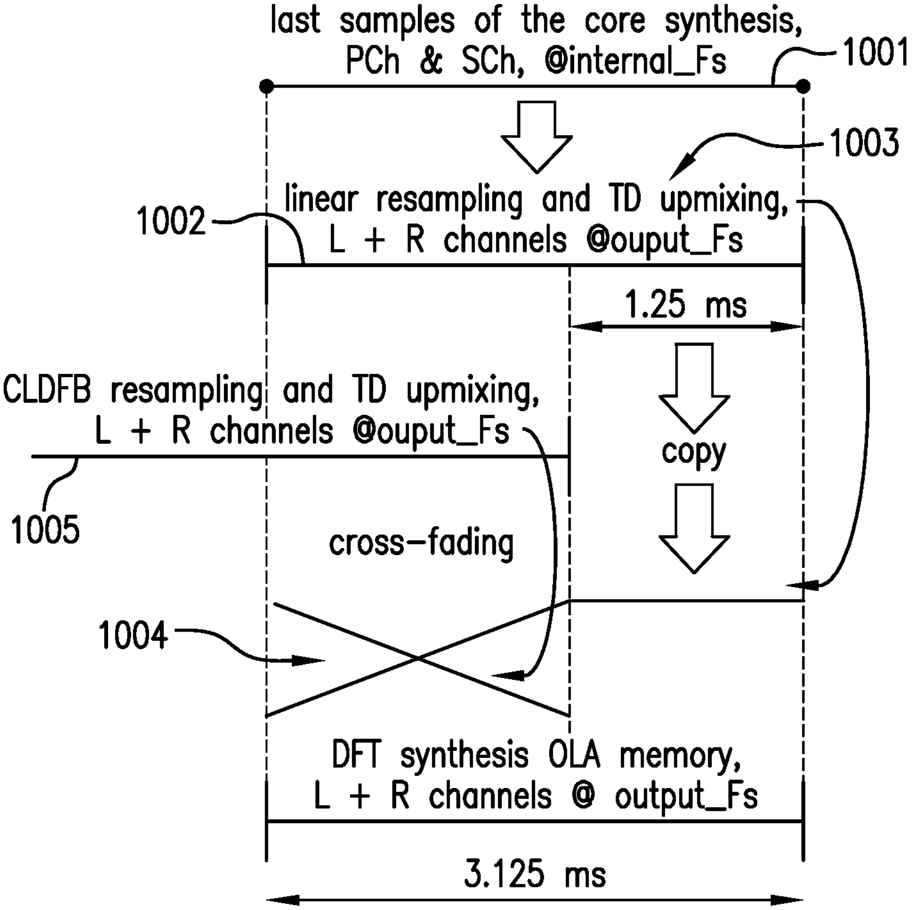
FIG. 10 is a flow chart illustrating an instance B) of FIG. 9, comprising updating DFT stereo synthesis memories in a TD stereo frame on the decoder side.

Specifically, the DFT stereo synthesis memories are updated by the stereo mode switching controller (not shown) using the following sub-operations as illustrated in FIG. 10. FIG. 10 is a flow chart illustrating the instance B) of FIG. 9, comprising updating DFT stereo synthesis memories in a TD stereo frame on the decoder side:

(a) The two channels l and r of the DFT stereo analysis memories at the internal sampling rate, input_mem_LB[ ], as reconstructed earlier during the decoding method 850 (they are identical to the core synthesis at the internal sampling rate), are subject to further processing depending on the actual decoding core:

- ACELP core: the last $L_{ovl}$ samples 1001 of the LB core synthesis of the primary PCh and secondary SCh channels at the internal sampling rate are resampled to the output stereo signal sampling rate using a simple linear interpolation with zero delay (See 1003).
- TCX/HQ core: the last $L_{ovl}$ samples 1001 of the LB core synthesis of the primary PCh and secondary SCh channels at the internal sampling rate are similarly resampled to the output stereo signal sampling rate using a simple linear interpolation with zero delay (See 1003). However, then, the TCX synchronization memory (the last 1.25 ms segment of the TCX synthesis from the previous frame) is used to update the last 1.25 ms of the resampled core synthesis.

(b) The linearly resampled LB signals corresponding to the 3.125 ms long part of the primary PCh and secondary SCh channels of the TD stereo frame 901 are up-mixed (See 1003) to form left l and right r channels, using the common TD stereo up-mixing routine while the TD stereo mixing ratio from the current frame is used (see TD up-mixing operation 862). The resulting signal is further called "reconstructed synthesis" 1002.

(c) The reconstruction of the first (3.125-1.25 ms) long part of the DFT stereo synthesis memories depends on the actual decoding core:

- ACELP core: A cross-fading 1004 between the CLDFB-based resampled and TD up-mixed synthesis 1005 at the output stereo signal sampling rate and the reconstructed synthesis 1002 (from the previous sub-operation (b)) is performed for both the channels l and r during the first (3.125-1.25) ms long part of the channels of the TD stereo frame 901.
- TCX/HQ core: The first (3.125-1.25) ms long part of the DFT stereo synthesis memories is updated using the up-mixed synthesis 1005.

(d) The 1.25 ms long last part of the DFT stereo synthesis memories is filled up with the last portion of the reconstructed synthesis 1002.

(e) The DFT synthesis window (904 in FIG. 9) is applied to the DFT OLA synthesis memories (defined herein above) only in the first DFT stereo frame 902 (if switching from TD to DFT stereo mode happens). It is noted that the last 1.25 ms part of the DFT OLA synthesis memories is of a limited importance as the DFT synthesis window shape 904 converges to zero and it thus masks the approximated samples of the reconstructed synthesis 1002 resulting from resampling based on simple linear interpolation.

Finally, the up-mixed reconstructed synthesis 1002 of the TD stereo frame 901 is aligned, i.e. delayed by 2 ms in the time synchronizer and stereo switch 814 in order to match the codec overall delay. Specifically:

- In case there is a switching from a TD stereo frame to a DFT stereo frame, other DFT stereo memories (other than overlap memories), i.e. DFT stereo decoder past frame parameters and buffers, are reset by the stereo mode switching controller (not shown).
- Then, the DFT stereo decoding (See 859), up-mixing (See 859) and DFT synthesis (See 855 and 856) are performed and the stereo output synthesis (channels l and r) is aligned, i.e. delayed by 0.125 ms in the time synchronizer and stereo switch 814 in order to match the codec overall delay.

Figure 11:
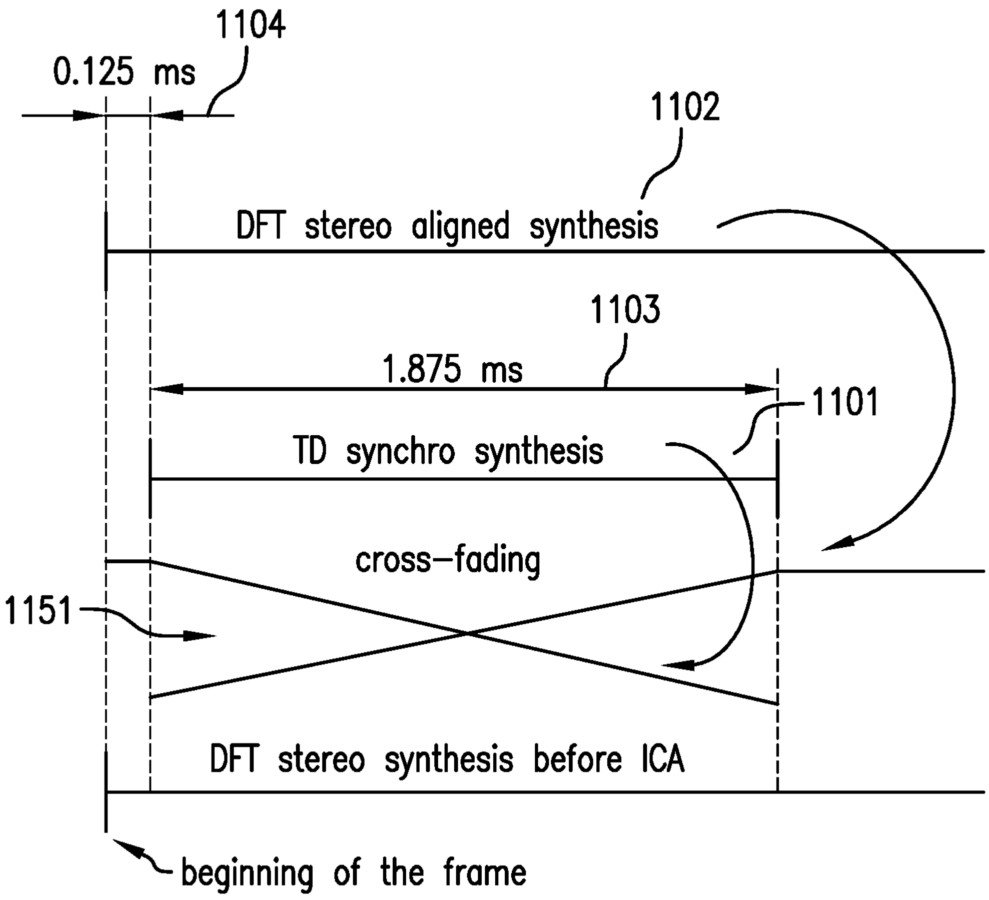
FIG. 11 is a flow chart illustrating an instance C) of FIG. 9, comprising smoothing an output stereo synthesis in the first DFT stereo frame following switching from the TD stereo mode to the DFT stereo mode, on the decoder side.

FIG. 11 is a flow chart illustrating an instance C) of FIG. 9, comprising smoothing the output stereo synthesis in the first DFT stereo frame 902 following stereo mode switching, on the decoder side.

Referring to FIG. 11, once the DFT stereo synthesis is aligned and synchronized to the codec overall delay in the first DFT stereo frame 902, the stereo mode switching controller (not shown) performs a cross-fading operation 1151 between the TD stereo aligned and synchronized synthesis 1101 (from operation 864) and the DFT stereo aligned and synchronized synthesis 1102 (from operation 864) to smooth the switching transition. The cross-fading is performed on a 1.875 ms long segment 1103 starting after a 0.125 ms delay 1104 at the beginning of both output channels l and r (all signals are at the output stereo signal sampling rate). This instance corresponds to instance C) in FIG. 9.

Decoding then continues regardless of the current stereo mode with the IC-BWE calculator 815, the ICA decoder 816 and common stereo decoder updates.

Figure 12:
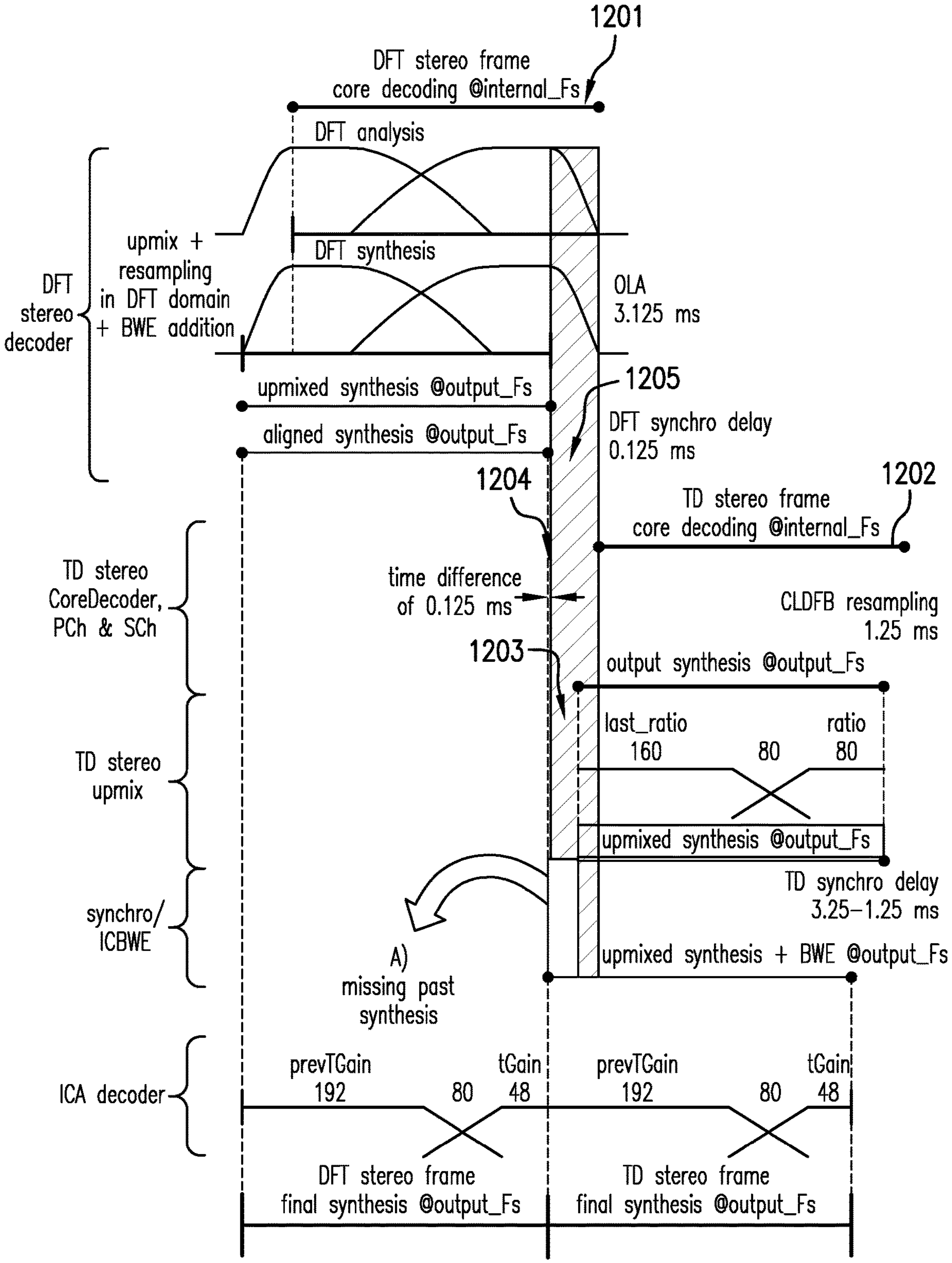
FIG. 12 is a flow chart illustrating processing operations in the IVAS stereo decoding device and method upon switching from the DFT stereo mode to the TD stereo mode.

2.4 Switching from the DFT Stereo Mode to the TD Stereo Mode at the IVAS Stereo Decoding Device The fundamentally different decoding operations between the DFT stereo mode and the TD stereo mode and the presence of two core-decoders 810 and 811 in the TD stereo decoder 802 makes switching from the DFT stereo mode to the TD stereo mode in the IVAS stereo decoding device 800 challenging. FIG. 12 is a flow chart illustrating processing operations in the IVAS stereo decoding device 800 and method 850 upon switching from the DFT stereo mode to the TD stereo mode. Specifically, FIG. 12 shows two frames of decoded stereo signal at different processing operations with related time instances upon switching from a DFT stereo frame 1201 to a TD stereo frame 1202.

Core-decoding may use a same processing regardless of the actual stereo mode with two exceptions.

First exception: In DFT stereo frames, resampling from the internal sampling rate to the output stereo signal sampling rate is performed in the DFT domain but the CLDFB resampling is run in parallel in order to maintain/update CLDFB analysis and synthesis memories in case the next frame is a TD stereo frame.

Second exception: Then, the BPF (Bass Post-Filter) (a low-frequency pitch enhancement procedure, see Reference [1], Clause 6.1.4.2) is applied in the DFT domain in DFT stereo frames while the BPF analysis and computation of error signal is done in the time-domain regardless of the stereo mode.

Otherwise, all internal states and memories of the core-decoder are simply continuous and well maintained when switching from the DFT mid-channel m to the TD primary channel PCh.

In the DFT stereo frame 1201, decoding then continues with core-decoding (857) of mid-channel m, calculation (854) of the DFT transform of the mid-channel m in the time domain to obtain mid-channel M in the DFT domain, and stereo decoding and up-mixing (859) of channels M and S into channels L and R in the DFT domain including decoding (858) of the residual signal. The DFT domain analysis and synthesis introduces an OLA delay of 3.125 ms. The synthesis transitions are then handled in the time synchronizer and stereo switch 814.

Upon switching from the DFT stereo frame 1201 to the TD stereo frame 1202, the fact that there is only one core-decoder 807 in the DFT stereo decoder 801 makes core-decoding of the TD secondary channel SCh complicated because the internal states and memories of the second core-decoder 811 of the TD stereo decoder 802 are not continuously maintained (on the contrary, the internal states and memories of the first core-decoder 810 are continuously maintained using the internal states and memories of the core-decoder 807 of the DFT stereo decoder 801). The memories of the second core-decoder 811 are thus usually reset in the stereo mode switching updates (See Table III) by the stereo mode switching controller (not shown). There are however few exceptions where the primary channel SCh memory is populated with the memory of certain PCh buffers, for example previous excitation, previous LSF parameters and previous LSP parameters. In any case, the synthesis at the beginning of the first TD secondary channel SCh frame after switching from the DFT stereo frame 1201 to the TD stereo frame 1202 consequently suffers from an imperfect reconstruction. Accordingly, while the synthesis from the first core-decoder 810 is well and smoothly decoded during stereo mode switching, the limited-quality synthesis from the second core decoder 811 introduces discontinuities during the stereo up-mixing and final synthesis (862). These discontinuities are suppressed by employing the DFT stereo OLA memories during the first TD stereo output synthesis reconstruction as described later.

The stereo mode switching controller (not shown) suppresses possible discontinuities and differences between the DFT stereo and the TD stereo up-mixed channels by a simple equalization of the signal energy. If the ICA target gain, $g_{ICA}$, is lower than 1.0, the channel l, $y_L(i)$, after the up-mixing (862) and before the time synchronization (864) is altered in the first TD stereo frame 1202 after stereo mode switching using the following relation:

$$y'_L(i)=\alpha\cdot y_L(i) \text{ for } i=0, \ldots, L_{eq}-1$$

where $L_{eq}$ is the length of the signals to equalize which corresponds in the IVAS stereo decoding device 800 to a 8.75 ms long segment (which corresponds for example to $L_{eq}$=140 samples at a 16 kHz output stereo signal sampling rate). Then, the value of the gain factor α is obtained using the following relation:

$$\alpha = g_{ICA} + i\cdot\frac{1-g_{ICA}}{g_{eq}} \text{ for } i = 0, \ldots , L_{eq}-1$$

Referring to FIG. 12, the instance A) relates to a missing part 1203 of the TD stereo up-mixed synchronized synthesis (from operation 864) of the TD stereo frame 1202 corresponding to a previous DFT stereo up-mixed synchronization synthesis memory from DFT stereo frame 1201. This memory of length of (3.25-1.25) ms is not available when switching from the DFT stereo frame 1201 to the TD stereo frame 1202 except for its first 0.125 ms long segment 1204.

Figure 13:
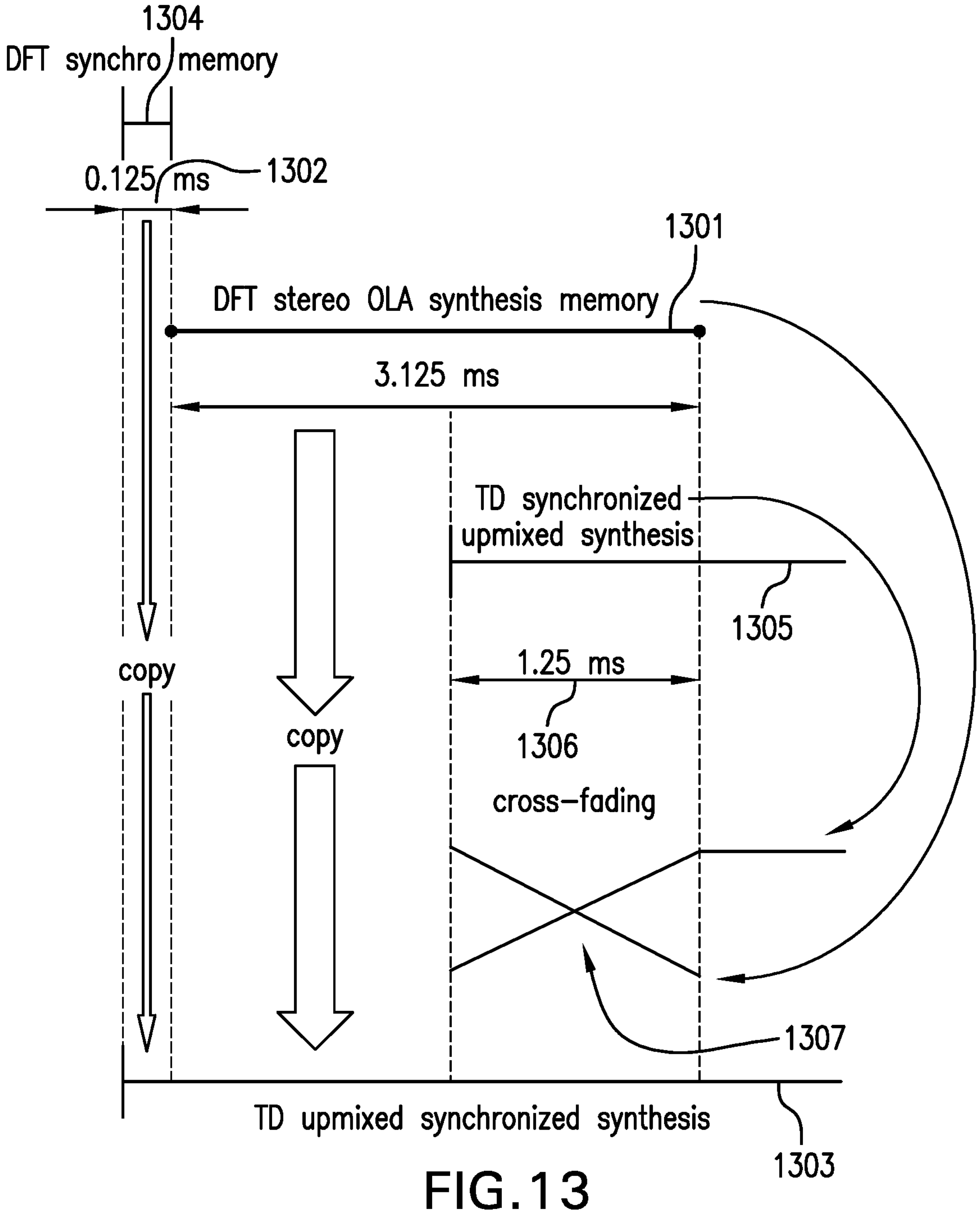
FIG. 13 is a flow chart illustrating an instance A) of FIG. 12, comprising updating a TD stereo synchronization memory in a first TD stereo frame following switching from the DFT stereo mode to the TD stereo mode, on the decoder side.

FIG. 13 is a flow chart illustrating the instance A) of FIG. 12, comprising updating the TD stereo up-mixed synchronization synthesis memory in a first TD stereo frame following switching from the DFT stereo mode to the TD stereo mode, on the decoder side.

Referring to both FIGS. 12 and 13, the stereo mode switching controller (not shown) reconstructs the 3.25 ms 1205 of the TD stereo up-mixed synchronized synthesis using the following operations (a) to (e) for both the left l and right r channels:

(a) The DFT stereo OLA synthesis memories (defined herein above) are redressed (i.e. the inverse synthesis window is applied to the OLA synthesis memories; See 1301).

(b) The first 0.125 ms part 1302 (See 1204 in FIG. 12) of the TD stereo up-mixed synchronized synthesis 1303 is identical to the previous DFT stereo up-mixed synchronization synthesis memory 1304 (last 0.125 ms long segment of the previous frame DFT stereo up-mixed synchronization synthesis memory) and is thus reused to form this first part of the TD stereo up-mixed synchronized synthesis 1303.

(c) The second part (See 1203 in FIG. 12) of the TD stereo up-mixed synchronized synthesis 1303 having a length of (3.125-1.25) ms is approximated with the redressed DFT stereo OLA synthesis memories 1301.

(d) The part of the TD stereo up-mixed synchronized synthesis 1303 with a length of 2 ms from the previous two steps (b) and (c) is then populated to the output stereo synthesis in the first TD stereo frame 1202.

(e) A smoothing of the transition between the previous DFT stereo OLA synthesis memory 1301 and the TD synchronized up-mixed synthesis 1305 from operation 864 of the current TD stereo frame 1202 is performed at the beginning of the TD stereo synchronized up-mixed synthesis 1305. The transition segment is 1.25 ms long (See 1306) and is obtained using a cross-fading 1307 between the redressed DFT stereo OLA synthesis memory 1301 and the TD stereo synchronized up-mixed synthesis 1305.

2.5 Switching from the TD Stereo Mode to the MDCT Stereo Mode in the IVAS Stereo Decoding Device Switching from the TD stereo mode to the MDCT stereo mode is relatively straightforward because both these stereo modes handle two transport channels and employ two core-decoder instances.

As an opposite-phase down-mixing scheme was employed in the TD stereo encoder 400, the stereo mode switching controller (not shown) similarly alters the TD stereo channel up-mixing to maintain the correct phase of the left and right channels of the stereo sound signal in the last TD stereo frame before the first MDCT stereo frame. Specifically, the stereo mode switching controller (not shown) sets the mixing ratio β=1.0 and implements an opposite-phase up-mixing (inverse to opposite-phase down-mixing employed in the TD stereo encoder 400) of the TD stereo primary channel PCh(i) and TD stereo secondary channel SCh(i) to calculate the MDCT stereo past left channel $l_{past}(i)$ and the MDCT stereo past right channel $r_{past}(i)$. Consequently, the TD stereo primary channel PCh(i) is identical to the MDCT stereo past left channel $l_{past}(i)$ and the TD stereo secondary channel SCh(i) signal is identical to the MDCT stereo past right channel $r_{past}(i)$.

2.6 Switching from the MDCT Stereo Mode to the TD Stereo Mode in the IVAS Stereo Decoding Device Similarly to the switching from the TD stereo mode to the MDCT stereo mode, two transport channels are available and two core-decoder instances are employed in this scenario. In order to maintain the correct phase of the left and right channels of the stereo sound signal, the TD stereo mixing ratio is set to 1.0 and the opposite-phase up-mixing scheme is used again by the stereo mode switching controller (not shown) in the first TD stereo frame after the last MDCT stereo frame.

2.7 Switching from the DFT Stereo Mode to the MDCT Stereo Mode in the IVAS Stereo Decoding Device A mechanism similar to the decoder-side switching from the DFT stereo mode to the TD stereo mode is used in this scenario, wherein the primary PCh and secondary SCh channels of the TD stereo mode are replaced by the left l and right r channels of the MDCT stereo mode.

2.8 Switching from the MDCT Stereo Mode to the DFT Stereo Mode in the IVAS Stereo Decoding Device A mechanism similar to the decoder-side switching from the TD stereo mode to the DFT stereo mode is used in this scenario, wherein the primary PCh and secondary SCh channels of the TD stereo mode are replaced by the left l and right r channels of the MDCT stereo mode.

Finally, the decoding continues regardless of the current stereo mode with the IC-BWE decoding 865 (skipped in the the MDCT stereo mode), adding of the HB synthesis (skipped in the MDCT stereo mode), temporal ICA alignment 866 (skipped in the MDCT stereo mode) and common stereo decoder updates.

2.9 Hardware Implementation

Figure 14:
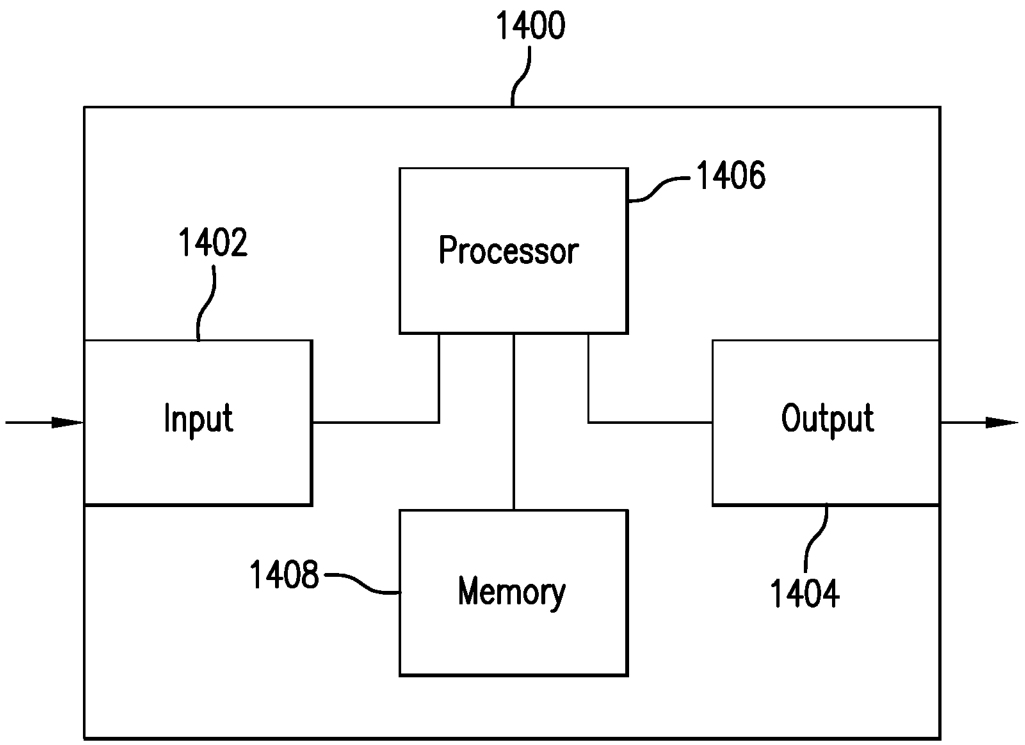
FIG. 14 is a simplified block diagram of an example configuration of hardware components implementing each of the IVAS stereo encoding device and method and IVAS stereo decoding device and method.

FIG. 14 is a simplified block diagram of an example configuration of hardware components forming each of the above described IVAS stereo encoding device 200 and IVAS stereo decoding device 800.

Each of the IVAS stereo encoding device 200 and IVAS stereo decoding device 800 may be implemented as a part of a mobile terminal, as a part of a portable media player, or in any similar device. Each of the IVAS stereo encoding device 200 and IVAS stereo decoding device 800 (identified as 1400 in FIG. 14) comprises an input 1402, an output 1404, a processor 1406 and a memory 1408.

The input 1402 is configured to receive the left l and right r channels of the input stereo sound signal in digital or analog form in the case of the IVAS stereo encoding device 200, or the bit-stream 803 in the case of the IVAS stereo decoding device 800. The output 1404 is configured to supply the multiplexed bit stream 206 in the case of the IVAS stereo encoding device 200 or the decoded left channel l and right channel r in the case of the IVAS stereo decoding device 800. The input 1402 and the output 1404 may be implemented in a common module, for example a serial input/output device.

The processor 1406 is operatively connected to the input 1402, to the output 1404, and to the memory 1408. The processor 1406 is realized as one or more processors for executing code instructions in support of the functions of the various elements and operations of the above described IVAS stereo encoding device 200, IVAS stereo encoding method 250, IVAS stereo decoding device 800 and IVAS stereo decoding method 850 as shown in the accompanying figures and/or as described in the present disclosure.

The memory 1408 may comprise a non-transient memory for storing code instructions executable by the processor 1406, specifically, a processor-readable memory storing non-transitory instructions that, when executed, cause a processor to implement the elements and operations of the IVAS stereo encoding device 200, IVAS stereo encoding method 250, IVAS stereo decoding device 800 and IVAS stereo decoding method 850. The memory 1408 may also comprise a random access memory or buffer(s) to store intermediate processing data from the various functions performed by the processor 1406.

Those of ordinary skill in the art will realize that the description of the IVAS stereo encoding device 200, IVAS stereo encoding method 250, IVAS stereo decoding device 800 and IVAS stereo decoding method 850 are illustrative only and are not intended to be in any way limiting. Other embodiments will readily suggest themselves to such persons with ordinary skill in the art having the benefit of the present disclosure. Furthermore, the disclosed IVAS stereo encoding device 200, IVAS stereo encoding method 250, IVAS stereo decoding device 800 and IVAS stereo decoding method 850 may be customized to offer valuable solutions to existing needs and problems of encoding and decoding stereo sound.

In the interest of clarity, not all of the routine features of the implementations of the IVAS stereo encoding device 200, IVAS stereo encoding method 250, IVAS stereo decoding device 800 and IVAS stereo decoding method 850 are shown and described. It will, of course, be appreciated that in the development of any such actual implementation of the IVAS stereo encoding device 200, IVAS stereo encoding method 250, IVAS stereo decoding device 800 and IVAS stereo decoding method 850, numerous implementation-specific decisions may need to be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of sound processing having the benefit of the present disclosure.

In accordance with the present disclosure, the elements, processing operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations and sub-operations is implemented by a processor, computer or a machine and those operations and sub-operations may be stored as a series of non-transitory code instructions readable by the processor, computer or machine, they may be stored on a tangible and/or non-transient medium.

Elements and processing operations of the IVAS stereo encoding device 200, IVAS stereo encoding method 250, IVAS stereo decoding device 800 and IVAS stereo decoding method 850 as described herein may comprise software, firmware, hardware, or any combination(s) of software, firmware, or hardware suitable for the purposes described herein.

In the IVAS stereo encoding method 250 and IVAS stereo decoding method 850 as described herein, the various processing operations and sub-operations may be performed in various orders and some of the processing operations and sub-operations may be optional.

Although the present disclosure has been described hereinabove by way of non-restrictive, illustrative embodiments thereof, these embodiments may be modified at will within the scope of the appended claims without departing from the spirit and nature of the present disclosure.

The present disclosure mentions the following references, of which the full content is incorporated herein by reference:

[1] 3GPP TS 26.445, v.12.0.0, "Codec for Enhanced Voice Services (EVS); Detailed Algorithmic Description", September 2014.

[2] M. Neuendorf, M. Multrus, N. Rettelbach, G. Fuchs, J. Robillard, J. Lecompte, S. Wilde, S. Bayer, S. Disch, C. Helmrich, R. Lefevbre, P. Gournay, et al., "The ISO/MPEG Unified Speech and Audio Coding Standard—Consistent High Quality for All Content Types and at All Bit Rates", *J. Audio Eng. Soc., vol.* 61, no. 12, pp. 956-977, December 2013.

[3] F. Baumgarte, C. Faller, "Binaural cue coding—Part I: Psychoacoustic fundamentals and design principles," IEEE Trans. Speech Audio Processing, vol. 11, pp. 509-519, November 2003.

[4] T. Vaillancourt, "Method and system using a long-term correlation difference between left and right channels for time domain down mixing a stereo sound signal into primary and secondary channels," PCT Application WO2017/049397A1.

[5] V. Eksler, "Method and Device for Allocating a Bit-Budget between Sub-Frames in a CELP Codec," PCT Application WO2019/056107A1.

[6] M. Neuendorf et al., "MPEG Unified Speech and Audio Coding—The ISO/MPEG Standard for High-Efficiency Audio Coding of all Content Types", Journal of the Audio Engineering Society, vol. 61, no 12, pp. 956-977, December 2013.

[7] J. Herre et al., "MPEG-H Audio—The New Standard for Universal Spatial/3D Audio Coding", in 137th International AES Convention, Paper 9095, Los Angeles, Oct. 9-12, 2014.

[8] 3GPP SA4 contribution S4-180462, "On spatial metadata for IVAS spatial audio input format", SA4 meeting #98, Apr. 9-13, 2018, https://www.3gpp.org/ftp/tsq_sa/WG4_CODEC/TSGS4_98/Docs/S4-180462.zip

[9] V. Malenovsky, T. Vaillancourt, "Method and Device for Classification of Uncorrelated Stereo Content, Cross-Talk Detection, and Stereo Mode Selection in a Sound Codec," U.S. Provisional Patent Application 63/075,984 filed on Sep. 9, 2020.

What is claimed is:

1. A device for encoding a stereo sound signal, comprising:

a first stereo encoder of the stereo sound signal using a first stereo mode operating in time domain (TD), wherein the first TD stereo mode, in TD frames of the stereo sound signal, (a) produces a first down-mixed signal and (b) uses first data structures and memories;

a second stereo encoder of the stereo sound signal using a second stereo mode operating in frequency domain (FD), wherein the second FD stereo mode, in FD frames of the stereo sound signal, (a) produces a second down-mixed signal and (b) uses second data structures and memories; and a controller of switching between (i) the first TD stereo mode and first stereo encoder, and (ii) the second FD stereo mode and second stereo encoder to code the stereo sound signal in time domain or frequency domain, wherein, upon switching from one of the first TD and second FD stereo modes to the other of the first TD and second FD stereo modes, the stereo mode switching controller recalculates at least one length of down-mixed signal in a current frame of the stereo sound signal, and wherein the recalculated down-mixed signal length in the first TD stereo mode is different from the recalculated down-mixed signal length in the second FD stereo mode.

2. The device as recited in claim 1, wherein the second FD stereo mode is a discrete Fourier transform (DFT) stereo mode.

3. The device as recited in claim 2, wherein, upon switching from one of the first TD and second DFT stereo modes to the other of the first TD and second DFT stereo modes, the stereo mode switching controller allocates/deallocates data structures to/from the first TD and second DFT stereo modes depending on a current stereo mode, to reduce memory impact by maintaining only those data structures that are employed in the current frame.

4. The device as recited in claim 3, wherein, upon switching from the first TD stereo mode to the second DFT stereo mode, the stereo mode switching controller deallocates TD stereo related data structures.

5. The device as recited in claim 4, wherein the TD stereo related data structures comprise a TD stereo data structure and/or data structures of a core-encoder of the first stereo encoder.

6. The device as recited in claim 2, wherein, upon switching from the first TD stereo mode to the second DFT stereo mode, the second stereo encoder continues a core-encoding operation in a DFT stereo frame following a TD stereo frame with memories of a primary channel PCh core-encoder.

7. The device as recited in claim 2, wherein the stereo mode switching controller uses stereo-related parameters from the said one stereo mode to update stereo-related parameters of the said other stereo mode upon switching from the said one stereo mode to the said other stereo mode.

8. The device as recited in claim 7, wherein the stereo-related parameters comprise a side gain and an Inter-Channel Time Delay (ITD) parameter of the second DFT stereo mode and a target gain and correlation lags of the first TD stereo mode.

9. The device as recited in claim 2, wherein the stereo mode switching controller updates a DFT analysis memory every TD frame by storing samples related to a last time period of a current TD frame.

10. The device as recited in claim 2, wherein the stereo mode switching controller maintains DFT related memories during TD frames.

11. The device as recited in claim 2, wherein the stereo mode switching controller, upon switching from the first TD stereo mode to the second DFT stereo mode, updates in a DFT frame following a TD frame a DFT synthesis memory using TD stereo memories corresponding to a primary channel PCh of the TD frame.

12. The device as recited in claim 2, wherein the stereo mode switching controller maintains a Finite Impulse Response (FIR) resampling filter memory during DFT frames of the stereo sound signal, and wherein the stereo mode switching controller updates in every DFT frame the FIR resampling filter memory used in a primary channel PCh in the first stereo encoder, using a segment of a mid-channel m before a last segment of first length of the mid-channel m in the DFT frame.

13. The device as recited in claim 12, wherein the stereo mode switching controller populates a FIR resampling filter memory used in a secondary channel SCh in the first stereo encoder, differently with respect to the update of the FIR resampling filter memory used in the primary channel PCh in the first stereo encoder.

14. The device as recited in claim 13, wherein the stereo mode switching controller updates in a current TD frame the FIR resampling filter memory used in the secondary channel SCh in the first stereo encoder, by populating the FIR resampling filter memory using a segment of a mid-channel m in the DFT frame before a last segment of second length of the mid-channel m.

15. The device as recited in claim 2, wherein, upon switching from the second DFT stereo mode to the first TD stereo mode, the stereo mode switching controller re-computes in a current TD frame a length of the down-mixed signal which is longer in a secondary channel SCh with respect to a recomputed length of the down-mixed signal in a primary channel PCh.

16. The device as recited in claim 2, wherein, upon switching from the second DFT stereo mode to the first TD stereo mode, the stereo mode switching controller cross-fades a recalculated primary channel PCh and a DFT mid-channel m of a DFT stereo channel to re-compute a primary down-mixed channel PCh in a first TD frame following a DFT frame.

17. The device as recited in claim 2, wherein, upon switching from the second DFT stereo mode to the first TD stereo mode, the stereo mode switching controller recalculates an ICA memory of a left I and right r channels corresponding to a DFT frame preceding a TD frame.

18. The device as recited in claim 17, wherein the stereo mode switching controller recalculates primary PCh and secondary SCh channels of the DFT frame by down-mixing the ICA-processed channels I and r using a stereo mixing ratio of the DFT frame.

19. The device as recited in claim 18, wherein the stereo mode switching controller recalculates a shorter length of secondary channel SCh when there is no stereo mode switching.

20. The device as recited in claim 18, wherein the stereo mode switching controller recalculates, in the DFT frame preceding the TD frame, a first length of primary channel PCh and a second length of secondary channel SCh, and wherein the first length is shorter than the second length.

21. The device as recited in claim 2, wherein the stereo mode switching controller stores two values of a pre-emphasis filter memory in every DFT frame of the stereo sound signal.

22. The device as recited in claim 2, further comprising:
secondary SCh channel core-encoder data structures,
wherein, upon switching from the second DFT stereo mode to the first TD stereo mode, the stereo mode switching controller resets or estimates the secondary channel SCh core-encoder data structures based on primary PCh channel core-encoder data structures.

23. A device for decoding a stereo sound signal, comprising:
- a first stereo decoder of the stereo sound signal using a first stereo mode operating in time domain (TD), wherein the first stereo decoder, in TD frames of the stereo sound signal, (a) decodes a down-mixed signal and (b) uses first data structures and memories;
- a second stereo decoder of the stereo sound signal using a second stereo mode operating in frequency domain (FD), wherein the second stereo decoder, in FD frames of the stereo sound signal, (a) decodes a second down-mixed signal and (b) uses second data structures and memories; and
- a controller of switching between (i) the first TD stereo mode and first stereo decoder and (ii) the second FD stereo mode and second stereo decoder, wherein, upon switching from one of the first TD and second FD stereo modes to the other of the first TD and second FD stereo modes, the stereo mode switching controller recalculates at least one length of down-mixed signal in a current frame of the stereo sound signal, and wherein the recalculated down-mixed signal length in the first TD stereo mode is different from the recalculated down-mixed signal length in the second FD stereo mode.

24. The device as recited in claim 23, wherein the second FD stereo mode is a discrete Fourier transform (DFT) stereo mode.

25. The device as recited in claim 24, wherein the first TD stereo mode uses first processing delays, the second DFT stereo mode uses second processing delays, and the first and second processing delays are different and comprise resampling and up-mixing processing delays.

26. The device as recited in claim 24, wherein the stereo mode switching controller allocates/deallocates data structures to/from the first TD and second DFT stereo modes depending on a current stereo mode, to reduce a static memory impact by maintaining only those data structures that are employed in the current frame.

27. The device as recited in claim 24, wherein, upon receiving a first DFT frame following a TD frame, the stereo mode switching controller resets a DFT stereo data structure.

28. The device as recited in claim 24, wherein, upon receiving a first TD frame following a DFT frame, the stereo mode switching controller resets a TD stereo data structure.

29. The device as recited in claim 24, wherein the stereo mode switching controller updates DFT stereo OLA memory buffers in every TD stereo frame.

30. The device as recited in claim 24, wherein the stereo mode switching controller updates DFT stereo analysis memories, and wherein, upon receiving a first DFT frame following a TD frame, the stereo mode switching controller uses a number of last samples of a primary channel PCh and a secondary channel SCh of the TD frame to update in the DFT frame the DFT stereo analysis memories of a DFT stereo mid-channel m and side channel s, respectively.

31. The device as recited in claim 24, wherein the stereo mode switching controller updates DFT stereo synthesis memories in every TD stereo frame.

32. The device as recited in claim 31, wherein, for updating the DFT stereo synthesis memories and for an ACELP core, the stereo mode switching controller reconstructs in every TD frame a first part of the DFT stereo synthesis memories by cross-fading (a) a CLDFB-based resampled and TD up-mixed left and right channel synthesis and (b) a reconstructed resampled and up-mixed left and right channel synthesis.

33. The device as recited in claim 24, wherein the stereo mode switching controller cross-fades a TD aligned and synchronized synthesis with a DFT stereo aligned and synchronized synthesis to smooth transition upon switching from a TD frame to a DFT frame.

34. The device as recited in claim 24, wherein the coding mode switching controller updates TD stereo synthesis memories during DFT frames in case a next frame is a TD frame.

35. The device as recited in claim 24, wherein, upon switching from a DFT frame to a TD frame, the stereo mode switching controller resets memories of a core-decoder of a secondary channel SCh in the first stereo decoder.

36. The device as recited in claim 24, wherein, upon switching from a DFT frame to a TD frame, the stereo mode switching controller suppresses discontinuities and differences between DFT and TD stereo up-mixed channels using signal energy equalization.

37. The device as recited in claim 24, wherein the stereo mode switching controller reconstructs a TD stereo up-mixed synchronized synthesis, and wherein the stereo mode switching controller uses the following operations (a) to (e) for both a left channel and a right channel to reconstruct the TD stereo up-mixed synchronized synthesis:

(a) redressing a DFT stereo OLA synthesis memory;

(b) reusing a DFT stereo up-mixed synchronization synthesis memory as a first part of the TD stereo up-mixed synchronized synthesis;

(c) approximating a second part of the TD stereo up-mixed synchronized synthesis using the redressed DFT stereo OLA synthesis memory; and (d) smoothing a transition between the DFT stereo up-mixed synchronization synthesis memory and a TD stereo synchronized up-mixed synthesis at the beginning of the TD stereo synchronized up-mixed synthesis by cross-fading the redressed DFT stereo OLA synthesis memory with the TD stereo synchronized up-mixed synthesis.

38. A method for encoding a stereo sound signal, comprising:

providing a first stereo encoder of the stereo sound signal using a first stereo mode operating in time domain (TD), wherein the first TD stereo mode, in TD frames of the stereo sound signal, (a) produces a first down-mixed signal and (b) uses first data structures and memories;

providing a second stereo encoder of the stereo sound signal using a second stereo mode operating in frequency domain (FD), wherein the second FD stereo mode, in FD frames of the stereo sound signal, (a) produces a second down-mixed signal and (b) uses second data structures and memories; and controlling switching between (i) the first TD stereo mode and first stereo encoder, and (ii) the second FD stereo mode and second stereo encoder to code the stereo sound signal in time domain or frequency domain, wherein, upon switching from one of the first TD and second FD stereo modes to the other of the first TD and second FD stereo modes, controlling stereo mode switching comprises recalculating at least one length of down-mixed signal in a current frame of the stereo sound signal, and wherein the recalculated down-mixed signal length in the first TD stereo mode is different from the recalculated down-mixed signal length in the second FD stereo mode.

39. The method as recited in claim 38, wherein the second FD stereo mode is a discrete Fourier transform (DFT) stereo mode.

40. The method as recited in claim 39, wherein, upon switching from the said one of the first TD and second DFT stereo modes to the said other of the first TD and second DFT stereo modes, controlling stereo mode switching comprises maintaining continuity of at least one of the following signals:

an input stereo signal including left and right channels;

a mid-channel used in the second DFT stereo mode;

a primary channel and a secondary channel used in the first TD stereo mode;

a down-mixed signal used in pre-processing; and a down-mixed signal used in core encoding.

41. The method as recited in claim 39, wherein, upon switching from the said one of the first TD and second DFT stereo modes to the said other of the first TD and second DFT stereo modes, controlling stereo mode switching comprises allocating/deallocating data structures to/from the first TD and second DFT stereo modes depending on a current stereo mode, to reduce memory impact by maintaining only those data structures that are employed in the current frame.

42. The method as recited in claim 41, wherein, upon switching from the first TD stereo mode to the second DFT stereo mode, controlling stereo mode switching comprises deallocating TD stereo related data structures, and wherein the TD stereo related data structures comprise a TD stereo data structure and/or data structures of a core-encoder of the first stereo encoder.

43. The method as recited in claim 39, wherein, upon switching from the first TD stereo mode to the second DFT stereo mode, the second stereo encoder continues a core-encoding operation in a DFT frame following a TD frame with memories of a primary channel PCh core-encoder.

44. The method as recited in claim 39, wherein controlling stereo mode switching comprises using stereo-related parameters from the said one stereo mode to update stereo-related parameters of the said other stereo mode upon switching from the said one stereo mode to the said other stereo mode.

45. The method as recited in claim 44, wherein controlling stereo mode switching comprises transferring the stereo-related parameters between data structures, and wherein the stereo-related parameters comprise a side gain and an Inter-Channel Time Delay (ITD) parameter of the second DFT stereo mode and a target gain and correlation lags of the first TD stereo mode.

46. The method as recited in claim 39, wherein controlling stereo mode switching comprises updating a DFT analysis memory every TD stereo frame by storing samples related to a last time period of a current TD stereo frame.

47. The method as recited in claim 39, wherein controlling stereo mode switching comprises maintaining DFT related memories during TD stereo frames.

48. The method as recited in claim 39, wherein controlling stereo mode switching comprises, upon switching from the first TD stereo mode to the second DFT stereo mode, updating in a DFT frame following a TD frame a DFT synthesis memory using TD stereo memories corresponding to a primary channel PCh of the TD frame.

49. The method as recited in claim 39, wherein controlling stereo mode switching comprises maintaining a Finite Impulse Response (FIR) resampling filter memory during DFT frames.

50. The method as recited in claim 49, wherein controlling stereo mode switching comprises updating in every DFT frame the FIR resampling filter memory used in a primary channel PCh in the first stereo encoder, using a segment of a mid-channel m before a last segment of first length of the mid-channel m in the DFT frame.

51. The method as recited in claim 49, wherein controlling switching comprises populating a FIR resampling filter memory used in a secondary channel SCh in the first stereo encoder, differently with respect to the update of the FIR resampling filter memory used in the primary channel PCh in the first stereo encoder.

52. The method as recited in claim 51, wherein controlling stereo mode switching comprises updating in a current TD frame the FIR resampling filter memory used in the secondary channel SCh in the first stereo encoder, by populating the FIR resampling filter memory using a segment of a mid-channel m in the DFT frame before a last segment of second length of the mid-channel m.

53. The method as recited in claim 39, wherein, upon switching from the second DFT stereo mode to the first TD stereo mode, controlling stereo mode switching comprises re-computing in a current TD frame a length of the down-mixed signal which is longer in a secondary channel SCh with respect to a recomputed length of the down-mixed signal in a primary channel PCh.

54. The method as recited in claim 39, wherein, upon switching from the second DFT stereo mode to the first TD stereo mode, controlling stereo mode switching comprises cross-fading a recalculated primary channel PCh and a DFT mid-channel m of a DFT channel to re-compute a primary down-mixed channel PCh in a first TD frame following a DFT frame.

55. The method as recited in claim 39, wherein, upon switching from the second DFT stereo mode to the first TD stereo mode, controlling stereo mode switching comprises recalculating an ICA memory of the left I and right r channels corresponding to a DFT frame preceding a TD frame.

56. The method as recited in claim 55, wherein controlling stereo mode switching comprises recalculating primary PCh and secondary SCh channels of the DFT frame by downmixing the ICA-processed channels I and r using a stereo mixing ratio of the DFT frame.

57. The method as recited in claim 56, wherein controlling stereo mode switching comprises recalculating a shorter length of secondary channel SCh when there is no stereo coding mode switching.

58. The method as recited in claim 56, wherein controlling stereo mode switching comprises recalculating, in the DFT frame preceding the TD frame, a first length of primary channel PCh and a second length of secondary channel SCh, and wherein the first length is shorter than the second length.

59. The method as recited in claim 39, wherein controlling stereo mode switching comprises storing two values of a pre-emphasis filter memory in every DFT frame.

60. The method as recited in claim 39, further comprising: secondary SCh channel core-encoder data structures, wherein, upon switching from the second DFT stereo mode to the first TD stereo mode, controlling stereo mode switching comprises resetting or estimating the secondary channel SCh core-encoder data structures based on primary PCh channel core-encoder data structures.

61. A method for decoding a stereo sound signal, comprising:

providing a first stereo decoder of the stereo sound signal using a first stereo mode operating in time domain (TD), wherein the first stereo decoder, in TD frames of the stereo sound signal, (a) decodes a down-mixed signal and (b) uses first data structures and memories;

providing a second stereo decoder of the stereo sound signal using a second stereo mode operating in frequency domain (FD), wherein the second stereo decoder, in FD frames of the stereo sound signal, (a) decodes a second down-mixed signal and (b) uses second data structures and memories; and controlling switching between (i) the first TD stereo mode and first stereo decoder and (ii) the second FD stereo mode and second stereo decoder, wherein, upon switching from one of the first TD and second FD stereo modes to the other of the first TD and second FD stereo modes, controlling stereo mode switching comprises recalculating at least one length of down-mixed signal in a current frame of the stereo sound signal, and wherein the recalculated down-mixed signal length in the first stereo mode is different from the recalculated down-mixed signal length in the second stereo mode.

62. The method as recited in claim 61, wherein the second FD stereo mode is a discrete Fourier transform (DFT) stereo mode.

63. The method as recited in claim 62, wherein the first stereo mode uses first processing delays, the second stereo mode uses second processing delays, and the first and second processing delays are different and comprise resampling and up-mixing processing delays.

64. The method as recited in claim 62, wherein, upon switching from one of the first TD and second DFT stereo modes to the other of the first FD and second DFT stereo modes, controlling stereo mode switching comprises maintaining continuity of at least one of the following signals and memories:

a mid-channel m used in the second DFT stereo mode;

a primary channel PCh and a secondary channel SCh used in the first TD stereo mode;

TCX-LTP post-filter memories;

DFT OLA analysis memories at an internal sampling rate and at an output stereo signal sampling rate;

DFT OLA synthesis memories at the output stereo signal sampling rate;

an output stereo signal, including channels I and r; and

HB signal memories, and channels I and r used in BWEs and IC-BWE.

65. The method as recited in claim 62, wherein controlling stereo mode switching comprises allocating/deallocating data structures to/from the first TD and second DFT stereo modes depending on a current stereo mode, to reduce a static memory impact by maintaining only those data structures that are employed in the current frame.

66. The method as recited in claim 62, wherein, upon receiving a first DFT frame following a TD frame, controlling stereo mode switching comprises resetting a DFT stereo data structure.

67. The method as recited in claim 62, wherein, upon receiving a first TD frame following a DFT frame, controlling switching comprises resetting a TD stereo data structure.

68. The method as recited in claim 62, wherein controlling stereo mode switching comprises updating DFT stereo OLA memory buffers in every TD frame.

69. The method as recited in claim 62, wherein controlling stereo mode switching comprises updating DFT stereo analysis memories.

70. The method as recited in claim 69, wherein, upon receiving a first DFT frame following a TD frame, controlling stereo mode switching comprises using a number of last samples of a primary channel PCh and a secondary channel SCh of the TD frame to update in the DFT frame the DFT stereo analysis memories of a DFT stereo mid-channel m and a side channel s, respectively.

71. The method as recited in claim 62, wherein controlling stereo mode switching comprises updating DFT stereo synthesis memories in every TD frame, and wherein, for updating the DFT stereo synthesis memories and for an ACELP core, controlling stereo mode switching comprises reconstructing in every TD frame a first part of the DFT stereo synthesis memories by cross-fading (a) a CLDFB-based resampled and TD up-mixed left and right channel synthesis and (b) a reconstructed resampled and up-mixed left and right channel synthesis.

72. The method as recited in claim 62, wherein controlling stereo mode switching comprises cross-fading a TD aligned and synchronized synthesis with a DFT stereo aligned and synchronized synthesis to smooth transition upon switching from a TD frame to a DFT frame.

73. The method as recited in claim 62, wherein controlling stereo mode switching comprises updating TD stereo synthesis memories during DFT frames in case a next frame is a TD frame.

74. The method as recited in claim 62, wherein, upon switching from a DFT frame to a TD frame, controlling switching comprises resetting memories of a core-decoder of a secondary channel SCh in the first stereo decoder.

75. The method as recited in claim 62, wherein, upon switching from a DFT frame to a TD frame, controlling stereo mode switching comprises suppressing discontinuities and differences between DFT and TD stereo up-mixed channels using signal energy equalization, and wherein, to suppress discontinuities and differences between the DFT and TD stereo up-mixed channels, controlling stereo mode switching comprises, if an ICA target gain, $g_{ICA}$, is lower than 1.0, altering the left channel l, $y_L(i)$, after up-mixing and before time synchronization in the TD frame using the following relation:

$$y'_L(i)=\alpha\cdot y_L(i) \text{ for } i=0, \ldots, L_{eq}-1$$

where $L_{eq}$ is a length of a signal to equalize, and $\alpha$ is a value of a gain factor obtained using the following relation:

$$\alpha = g_{ICA} + i\cdot\frac{1-g_{ICA}}{L_{eq}} \text{ for } i=0, \ldots, L_{eq}-1.$$

76. The method as recited in claim 62, wherein controlling stereo mode switching comprises reconstructing a TD stereo up-mixed synchronized synthesis, and wherein controlling switching comprises using the following operations (a) to (e) for both a left channel and a right channel to reconstruct the TD stereo up-mixed synchronized synthesis:

(a) redressing a DFT stereo OLA synthesis memory;

(b) reusing a DFT stereo up-mixed synchronization synthesis memory as a first part of the TD stereo up-mixed synchronized synthesis;

(c) approximating a second part of the TD stereo up-mixed synchronized synthesis using the redressed DFT stereo OLA synthesis memory; and (d) smoothing a transition between the DFT stereo up-mixed synchronization synthesis memory and a TD stereo synchronized up-mixed synthesis at the beginning of the TD stereo synchronized up-mixed synthesis by cross-fading the redressed DFT stereo OLA synthesis memory with the TD stereo synchronized up-mixed synthesis.

* * * * *